(12) United States Patent
Depenbusch et al.

(10) Patent No.: US 12,391,364 B2
(45) Date of Patent: Aug. 19, 2025

(54) SYSTEMS AND METHODS FOR AIRCRAFT FUNCTION PRIORITIZATION AND ALLOCATION

(71) Applicant: Archer Aviation Inc., San Jose, CA (US)

(72) Inventors: Nathan Thomas Depenbusch, Mountain View, CA (US); Sang Gyun Park, Campbell, CA (US); Jenner Grey Richards, Sunnyvale, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/029,343

(22) Filed: Jan. 17, 2025

(65) Prior Publication Data

US 2025/0162708 A1 May 22, 2025

Related U.S. Application Data

(63) Continuation of application No. PCT/US2024/037417, filed on Jul. 10, 2024.
(Continued)

(51) Int. Cl.
*B64C 13/00* (2006.01)
(52) U.S. Cl.
CPC .................... *B64C 13/00* (2013.01)
(58) Field of Classification Search
CPC .................................................. B64C 13/00
See application file for complete search history.

(56) References Cited

U.S. PATENT DOCUMENTS

| 5,001,646 A | 3/1991 | Caldwell et al. |
| 9,898,033 B1 | 2/2018 | Long |

(Continued)

FOREIGN PATENT DOCUMENTS

| EP | 3772461 B1 | 11/2022 |
| EP | 3891067 B1 | 1/2024 |

(Continued)

OTHER PUBLICATIONS

PCT International Search Report and Written Opinion mailed Sep. 26, 2024, issued for International Application No. PCT/US2024/037417 (17 pgs.).

(Continued)

*Primary Examiner* — Ian Jen
(74) *Attorney, Agent, or Firm* — Finnegan, Henderson, Farabow, Garrett & Dunner, LLP

(57) ABSTRACT

Aspects of the present disclosure generally relate to systems and methods for flight control of aircrafts driven by electric propulsion systems and in other types of vehicles. In some embodiments, a computer-implemented method for command prioritization in an aircraft is disclosed. The method comprises receiving a pilot command, analyzing the pilot command to determine characteristics associated with the pilot command, wherein the characteristics to airspeed and climb of an aircraft, assigning weights to characteristics associated with the pilot command based on constraint data, determining priority of execution between airspeed and climb based on the weights assigned to the characteristics associated with the pilot command, calculating a correction factor to be applied to the characteristics associated with the pilot command based on determined priority and generating at least one actuator command to control the aircraft based on determined priority of execution.

30 Claims, 22 Drawing Sheets

Related U.S. Application Data

(60) Provisional application No. 63/610,327, filed on Dec. 14, 2023, provisional application No. 63/512,784, filed on Jul. 10, 2023.

(56) References Cited

U.S. PATENT DOCUMENTS

| | | |
|---|---|---|
| 2002/0153452 A1 | 10/2002 | King et al. |
| 2004/0093130 A1 | 5/2004 | Osder et al. |
| 2010/0076625 A1 | 3/2010 | Yoeli |
| 2013/0138270 A1 | 5/2013 | Christensen et al. |
| 2018/0275044 A1* | 9/2018 | Surana ............... G01N 19/08 |
| 2019/0332125 A1 | 10/2019 | Irwin, III et al. |
| 2020/0047885 A1* | 2/2020 | Gallo .................. B64D 1/12 |
| 2020/0130831 A1* | 4/2020 | Luca .................... B64C 5/12 |
| 2020/0290742 A1* | 9/2020 | Kumar ................ B64D 27/10 |
| 2020/0333805 A1 | 10/2020 | English et al. |
| 2021/0294355 A1 | 9/2021 | English |
| 2021/0362847 A1 | 11/2021 | Mahboubi |
| 2022/0335837 A1* | 10/2022 | Agyekum ............ G08G 5/30 |

FOREIGN PATENT DOCUMENTS

| | | |
|---|---|---|
| EP | 4345001 A1 | 4/2024 |
| EP | 4400932 A1 | 7/2024 |
| WO | 2020180373 A2 | 9/2020 |
| WO | 2023024102 A1 | 3/2023 |

OTHER PUBLICATIONS

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

* cited by examiner

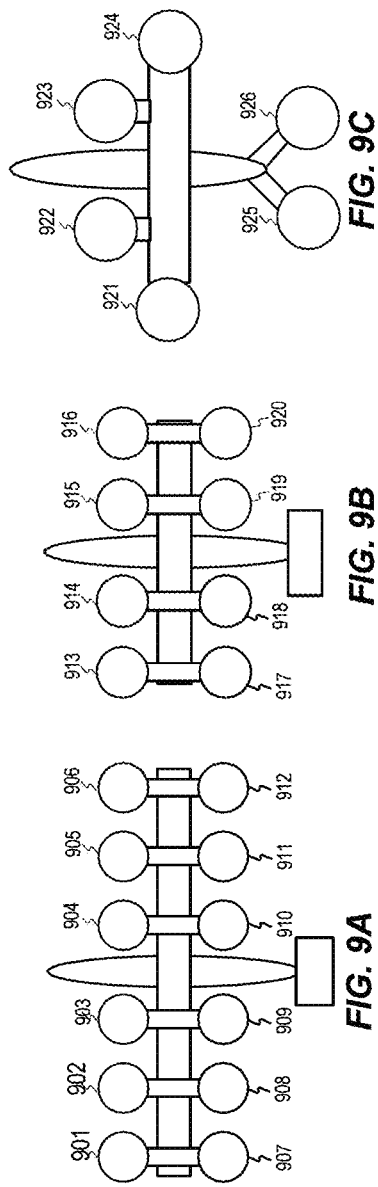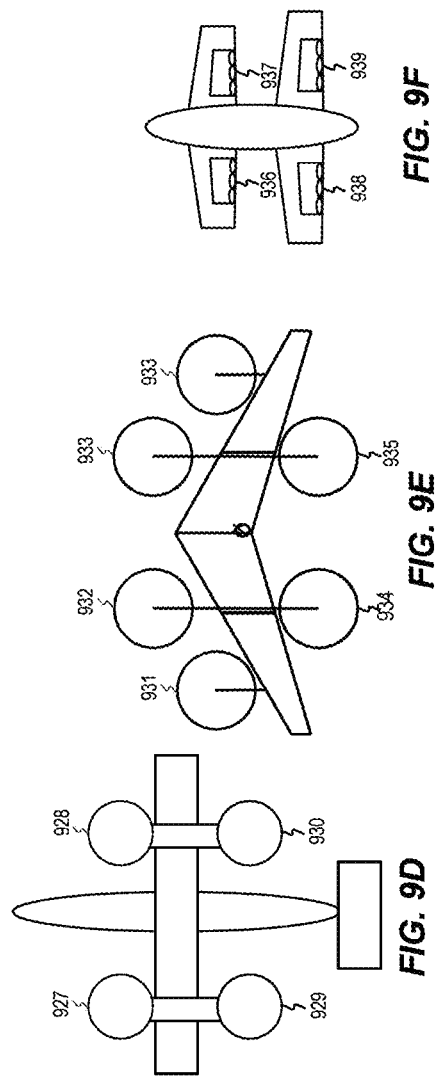

SYSTEMS AND METHODS FOR AIRCRAFT FUNCTION PRIORITIZATION AND ALLOCATION

CROSS-REFERENCE TO RELATED APPLICATIONS

This disclosure is a continuation of, and claims priority to and benefit of, PCT Application No. PCT/US2024/037417 titled "SYSTEMS AND METHODS FOR AIRCRAFT FUNCTION PRIORITIZATION AND ALLOCATION," filed on Jul. 10, 2024 which claims priority to U.S. Provisional Application No. 63/512,784 titled "SYSTEMS AND METHODS FOR FLIGHT CONTROL OF EVTOL AIRCRAFT," filed on Jul. 10, 2023, and U.S. Provisional Application No. 63/610,327 titled "SYSTEMS AND METHODS FOR FLIGHT CONTROL OF EVTOL AIRCRAFT," filed on Dec. 14, 2023, the contents of all of which are incorporated herein in their entireties for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). While conventional aircrafts may rely on a one-to-one mapping between control surfaces and axes of motion, over-actuated aircrafts such as vertical take-off and landing (VTOL) aircrafts are equipped with more control surfaces than axes of motion, offering enhanced maneuverability and improved performance.

However, while control of conventional aircrafts may rely on pre-calculated look-up tables translating pilot command into actuator displacements, over-actuated aircrafts offer a large number of alternative ways in which a command may be executed. This poses significant challenges in terms of control complexity, rendering conventional look-up tables completely impractical and unfeasible for implementation in over-actuated aircrafts. Moreover, control system of such aircraft necessitates a high degree of dynamic adaptability, requiring computationally intensive real-time command calculations and optimization efforts, considering energy costs and hardware limitations for execution of pilot commands.

Therefore, there is a need for improved systems and methods for certain aircrafts to provide a reliable flight control systems.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to computer-implemented method for command prioritization in an aircraft. Further, certain embodiments may relate to a computer-implemented optimization method for controlling flight of an aircraft.

Disclosed embodiments may include a computer-implemented method for command prioritization in an aircraft. The method may comprise receiving a pilot command or an input indicative of pilot command. The pilot command may be analyzed to determine characteristics associated with the pilot command, wherein the characteristics associated with the pilot command may relate to airspeed and climb of an aircraft. The method may also comprise determining priority of execution between airspeed and climb based on the weights assigned to the characteristics associated with the pilot command, which may be followed by calculating a correction factor to be applied to the characteristics associated with the pilot command based on determined priority. Based on the determined priority of execution, the method may comprise generating at least one actuator command to control the aircraft.

In some embodiments, the method may further comprise performing at least one saturation check based on the pilot command and calculating a command limit base on the at least one saturation check.

In some embodiments, determining the priority of execution between airspeed and climb may be performable by a prioritization function configured to determine the priority of execution in response to a saturation detection based on the at least one saturation check. In some embodiments, executing the prioritization function may be performable by an outer loop allocation system.

In some embodiments, performing the at least one saturation check may comprise determining if a thrust demand for at least one propeller of the aircraft may be saturated.

In some embodiments, the method for command prioritization may further comprise converting the pilot command into at least one of a pitch command, a force command, or a moment command.

In some embodiments, the characteristics associated with the pilot command may further relate to at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft.

In some embodiments, the constraint data may be based on at least one of a current state of flight, an integrity threshold of at least one actuator, a failure scenario of at least one effector of the aircraft, or at least one limit from a flight envelope of the aircraft. The current state of flight may comprise at least one of an airspeed of the aircraft, an altitude of the aircraft, a propeller tilt angle of at least one propeller of the aircraft, or a pitch angle of the aircraft. The constraint data may be defined based on at least one of a flight safety envelope, a physical limit of operation of at least one actuator of the aircraft, a physical limit of operation of at least one effector of the aircraft, or a saturation check. In some embodiments, the constraint data may include a minimum airspeed to prevent stall of the aircraft.

In some embodiments, the weights assigned to the characteristics associated with the pilot command may be used by an optimization algorithm. The weights assigned to the characteristics associated with the pilot command may also comprise two weights that may negatively correlated with each other.

In some embodiment, the priority of execution between airspeed and climb may be expressed by a linear function or by a non-linear function.

Some embodiments of the present disclosure may relate to a vertical take-off and landing aircraft (VTOL), that may comprise a fuselage, at least one wing mounted to the fuselage, at least one stabilizer mounter to the rear of the fuselage, a plurality of propellers mounted to the at least one wings, wherein at least one of the propellers is tiltable. The aircraft may also comprise a flight control system comprising a processing unit configured to carry out the computer-implemented method for command prioritization in an aircraft.

Some embodiments of the present disclosure may relate to a system for command prioritization in an aircraft. The system may comprise a plurality of actuators, with each actuator coupled to at least one effector and at least one processor. The at least one processor may be configured to receive a pilot command and analyze the pilot command to determine characteristics associated with the pilot command, the characteristics relating to airspeed and climb of an aircraft. The at least one processor may be configured to assign weights to characteristics associated with the pilot command based on constraint data and to determine priority of execution between airspeed and climb based on weights assigned to the characteristics associated with the pilot command. The at least one processor may also calculate a correction factor to be applied to characteristics associated with the pilot command based on determined priority and generate at least one actuator command to control the aircraft based on determined priority of execution.

In some embodiments, the processor may be further configured to perform at least one saturation check on the pilot command and calculate a command limit base on the at least one saturation check.

In some embodiment, the at least one processor may be configured to execute a prioritization function to determine the priority of execution between airspeed and climb in response to a saturation detection based on the at least one saturation check. The at least one processor may also be configured to perform the at least one saturation check by determining if a thrust demand for at least one propeller of the aircraft is saturated. In some embodiments Another aspect of the present disclosure relates to a computer-implemented optimization method for controlling flight of an aircraft. The optimization method may comprise receiving one or more control inputs. In some embodiments receiving at least one control input may comprise receiving at least one of a longitudinal control input or a vertical control input. The optimization method may also determine one or more constraints based on an engine status of each engine of the aircraft and an aircraft configuration and computing a weighting factor for each control input of the received one or more control inputs.

The optimization method may further comprise computing a set of actuator commands based on the received one or more control inputs, one or more constraints, and the weighting factor for each control input. In some embodiments, the weighting factor for each control input may be based on a state of flight of the aircraft and the one or more constraints may be dynamic and based on at least one of an integrity threshold of at least on actuator of the aircraft, a failure scenario of at least one effector of the aircraft, or at least one limit from a flight envelope of the aircraft.

The method may further comprise generating one or more state parameter commands based on the computed set of actuator commands. The one or more state parameter commands may comprise at least one force command or attitude command. The method may also comprise controlling one or more flight control effectors of the aircraft based on the generated one or more state parameter commands.

In some embodiments, generating a set of actuator commands may comprise computing a Jacobian matrix indicative of force and moment changes with respect to each control input and generating a set of actuator displacement vectors using a pseudo-inverse matrix of the Jacobian matrix, which may be followed by solving a minimization problem to produce a set of optimized actuator commands for controlling the one or more flight control effectors. In some embodiments, solving the minimization problem to produce the set of optimized actuator commands further may comprise solving a quadratic programming problem to minimize a cost function output associated with the set of actuator commands.

In some embodiments the optimization method may be performable by at least one outer loop allocation function.

Another aspect of the present disclosure may relate to a vertical take-off and landing (VTOL) aircraft, which may comprise a fuselage, at least one wing mounted to the fuselage, at least one stabilizer mounter to the rear of the fuselage, and a plurality of propellers mounted to the at least one wings, wherein at least one of the propellers may be tiltable. The aircraft may also comprise a flight control system that may comprise a processing unit configured to carry out the optimization method for controlling flight of an aircraft.

Another aspect of the present disclosure may relate to a flight control system for outer loop allocation in an aircraft. The system may comprise a plurality of actuators, where each actuator may be coupled to at least one effector, and at least one processor. The processor may be configured to receive at least one control input, determine one or more constraints based on an engine status of each engine of the aircraft and an aircraft configuration and compute a weighting factor for each control input of the received one or more control inputs. The system may also compute one or more forces and aircraft state parameters based on the received one or more control inputs, one or more constraints, and the weighting factor for each control input. The one or more aircraft state parameters may comprise at least one force or aircraft attitude. The at least one processor may also be configured to generate a set of actuator commands based on the computed one or more forces and aircraft state parameters and to control one or more flight control effectors of the aircraft based on the generated set of actuator commands.

In some embodiments of the present disclosure, the at least one processor may be configured to compute a Jacobian matrix indicative of force and moment changes with respect to each control input, generate a set of actuator displacement vectors using pseudo-inverse matrix of the Jacobian matrix and solve a minimization problem to produce a set of optimized actuator commands for controlling one or more flight control effectors.

In some embodiments, the flight control system or the at least one processor may comprise memory that may be configured to store an aircraft model database.

BRIEF DESCRIPTION OF THE DRAWINGS

FIGS. 9A-9F illustrate exemplary top plan views of VTOL aircraft, consistent with disclosed embodiments.

DETAILED DESCRIPTION

Figure 1:
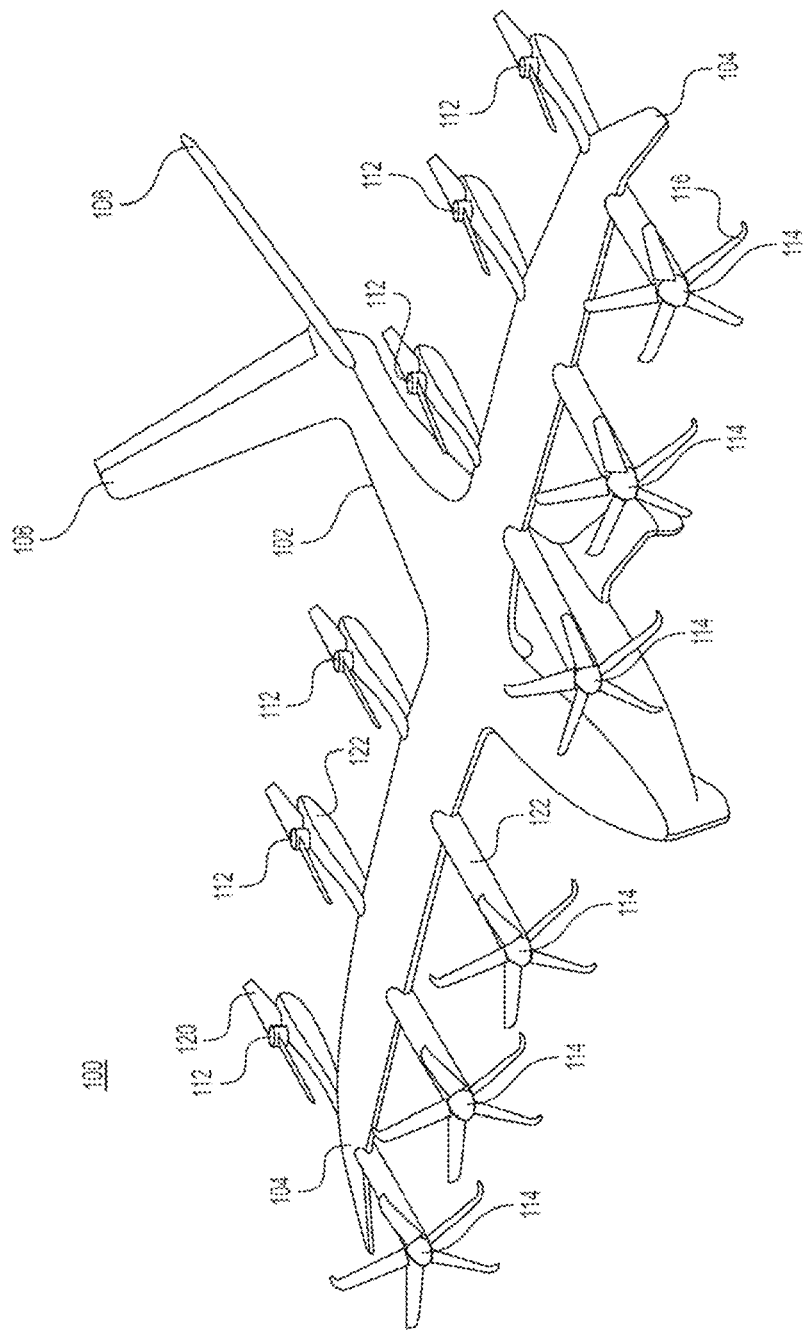
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is imperative to control the aircraft in a manner that ensures safe and comfortable flight, while optimizing pilot command execution to improve aircraft performance (e.g., increase safety, fuel efficiency, ride comfort, payload capacity, or structural integrity).

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, a "phase of flight," "state of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command (e.g., a roll command, yaw command, pitch command, acceleration command, deceleration command, autopilot command, or any command to exercise one or more aircraft functionalities), or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed herein, embodiments of the aircraft may comprise a plurality of actuators and effectors working together to generate forces and moments necessary for aircraft control and navigation. Unlike conventional aircrafts, VTOL aircraft may be defined as an over-actuated aircraft, i.e. an aircraft where a number of control effectors may be greater than a number of control axes, resulting in a large number of possible ways in which a command or maneuver may be executed. However, not all the possible methods of command execution may be equivalent, with some methods requiring significant energy cost, while others resulting in poor passenger comfort. The embodiments of the present disclosure may discuss methods and systems for optimization of command execution that may be dictated by desired aircraft performance criteria.

Moreover, some embodiments of the present disclosure may relate to electric aircraft, and the challenges relating to command prioritization from the energy efficiency and safety perspectives. Energy efficient operation may have a direct impact on aircraft's endurance and payload capacity and may also reduce the frequency and duration of charging cycles, enhancing turnaround times and operational availability. Moreover, energy-efficient operations contribute to lower operating costs and reduced environmental impact, aligning with the sustainability goals that often motivate the development of electric aviation technology.

Power availability in an electric aircraft may impose restrictions on execution of pilot commands. Some embodiments of the present disclosure describe methods and systems of command prioritization in operating scenarios in which original pilot command may not be executed in full due to energy constraints or for safety reasons. In some embodiments, the methods and system of the present disclosure may provide a way to safely reduce airspeed and/or climb associated with the pilot command, ensuring safe, comfortable and energy efficient operation of an aircraft.

In some embodiments, an aircraft of any of the disclosed embodiments may be simulated. For example, the aircraft may be in a simulated environment in a simulator (e.g., a simulator for flight training) or a virtual environment in a video game. Additionally or alternatively, in some embodiments, a display of an aircraft may be simulated. For example, the display (e.g., control margin display) may be in a simulated environment in a simulator (e.g., a simulator for flight training) or a virtual environment in a video game. A representation of the simulated display may be displayed on a display device (e.g., monitor, tablet, smartphone, computer screen, or any other display device) operatively connected to a processor configured to execute software code stored in a storage medium for performing flight controls operations, such as those further detailed below with reference to FIG. 10.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended clauses.

Figure 2:
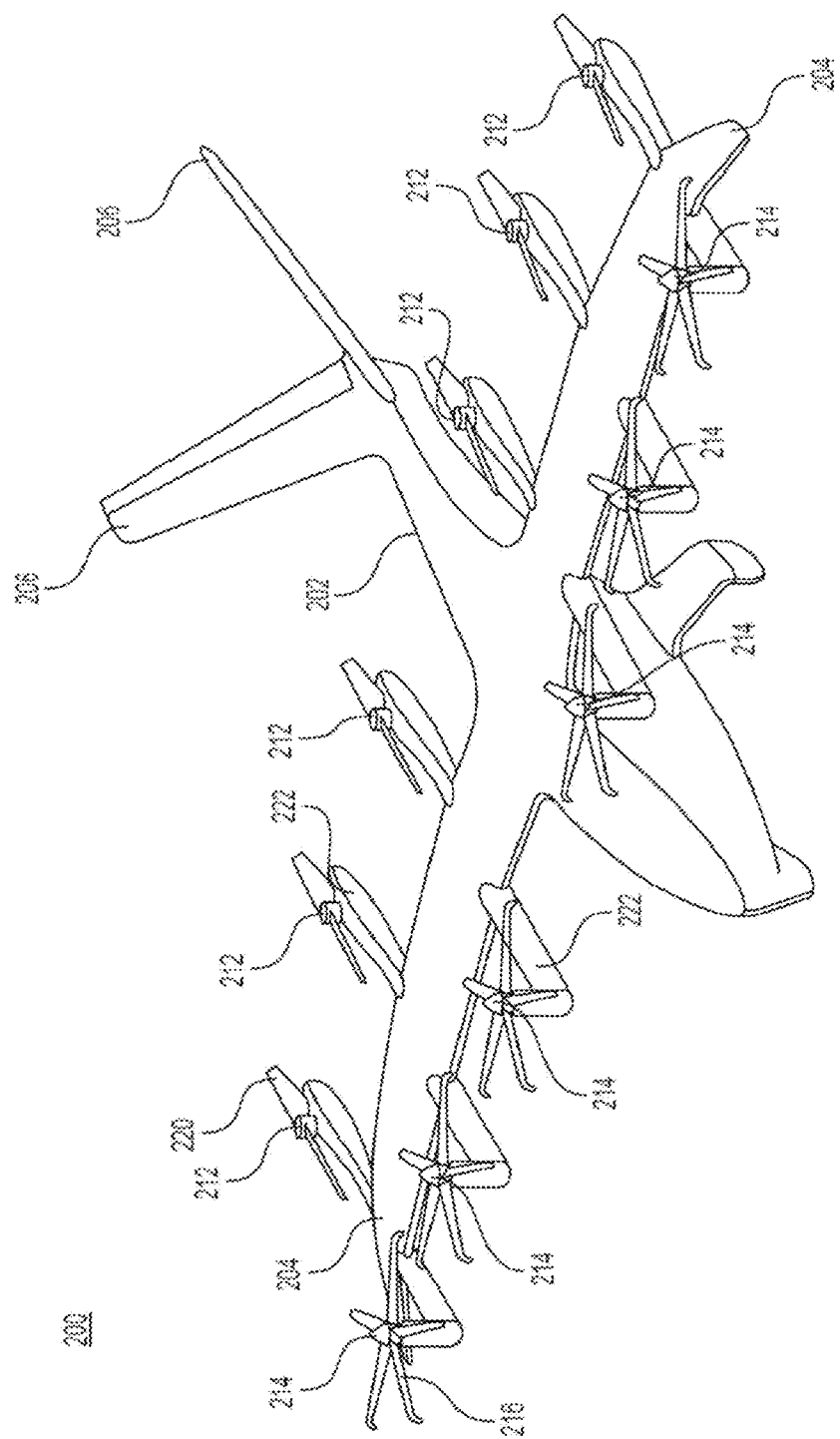
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG.

2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
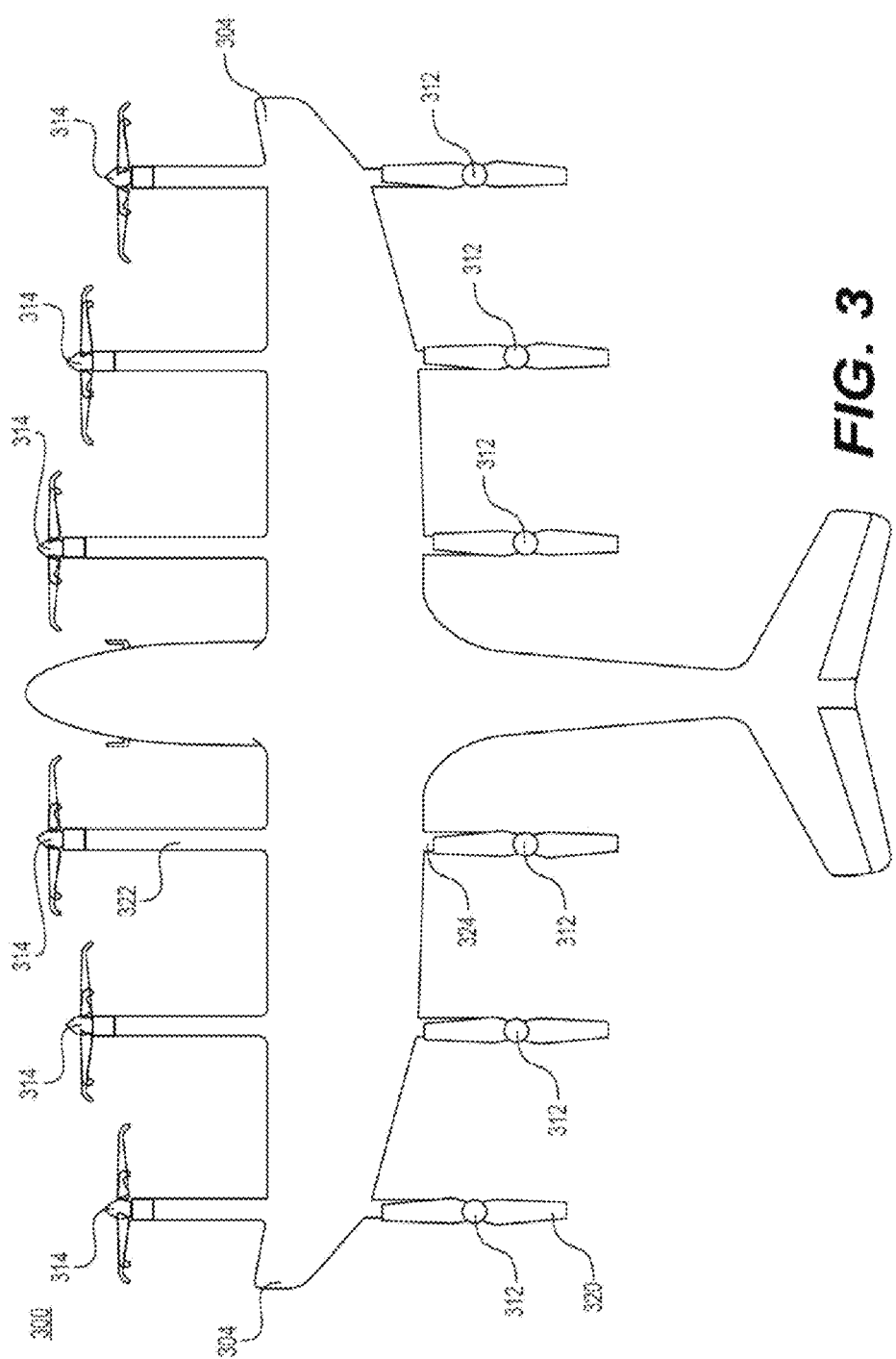
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
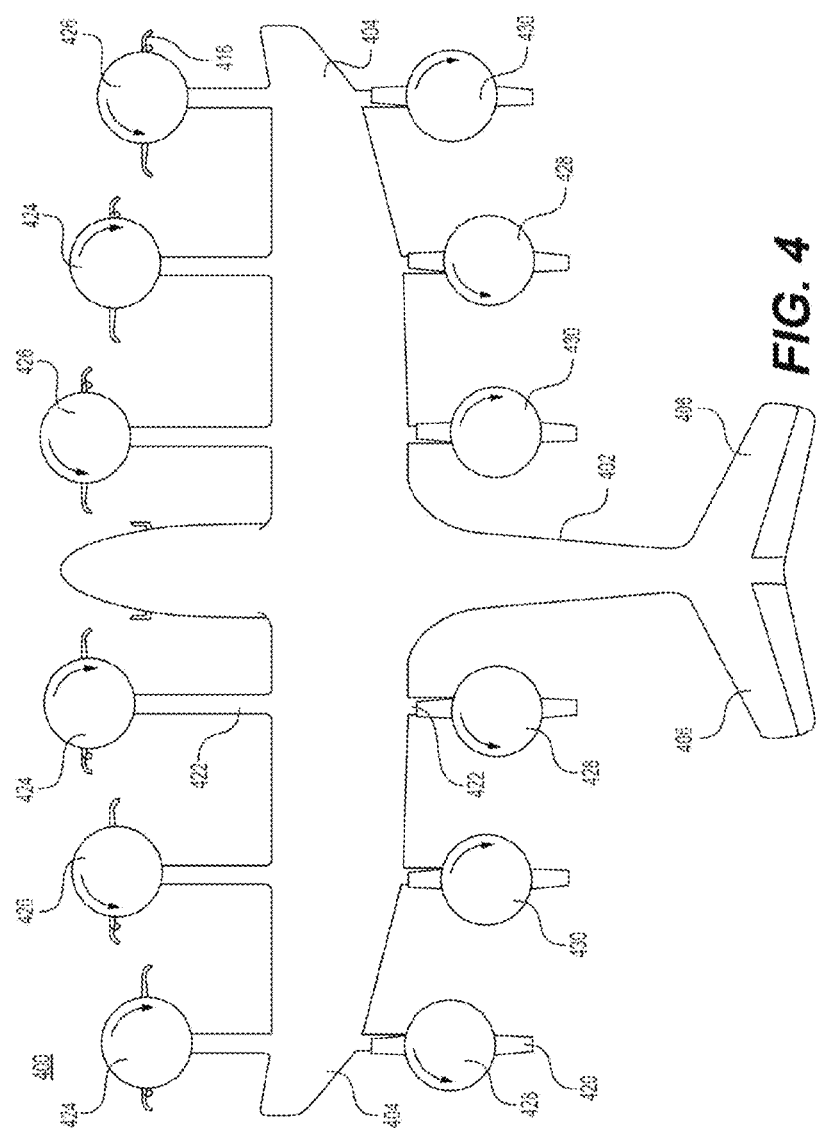
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
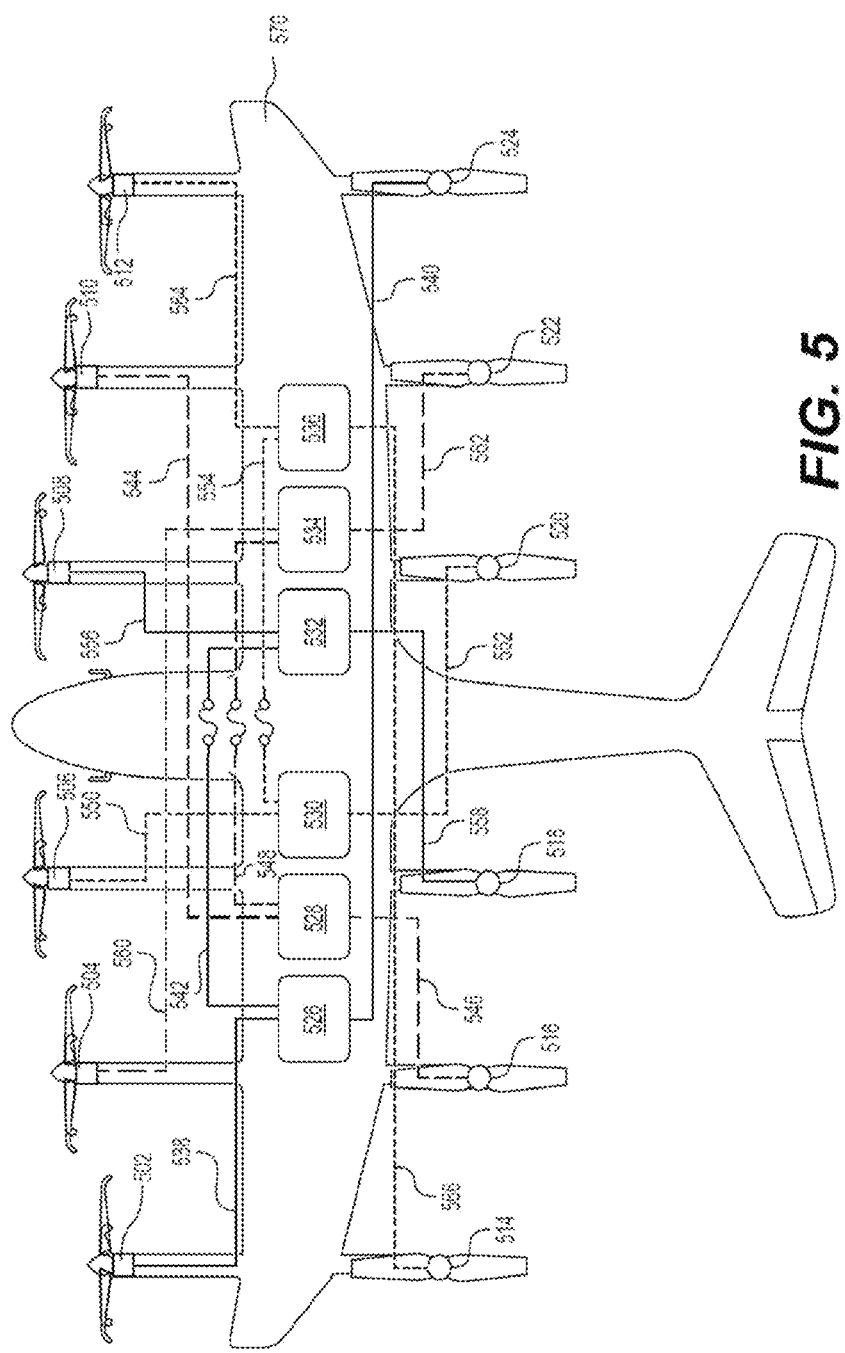
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. The forward electric engines 502, 504, 506, 508, 510, and 512 may be connected to power systems 526, 528, 530, 532, 534, and 536 via connections 538, 544, 550, 556, 560 and 564. The aft electric engines 514, 516, 518, 520, 522, and 524 may be connected to power systems 526, 528, 530, 532, 534, and 536 via connections 540, 546, 552, 558, 562 and 566. In addition, power systems 526, 528, 530, 532, 534, and 536 may be interconnected via connections 542, 548 and 554. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
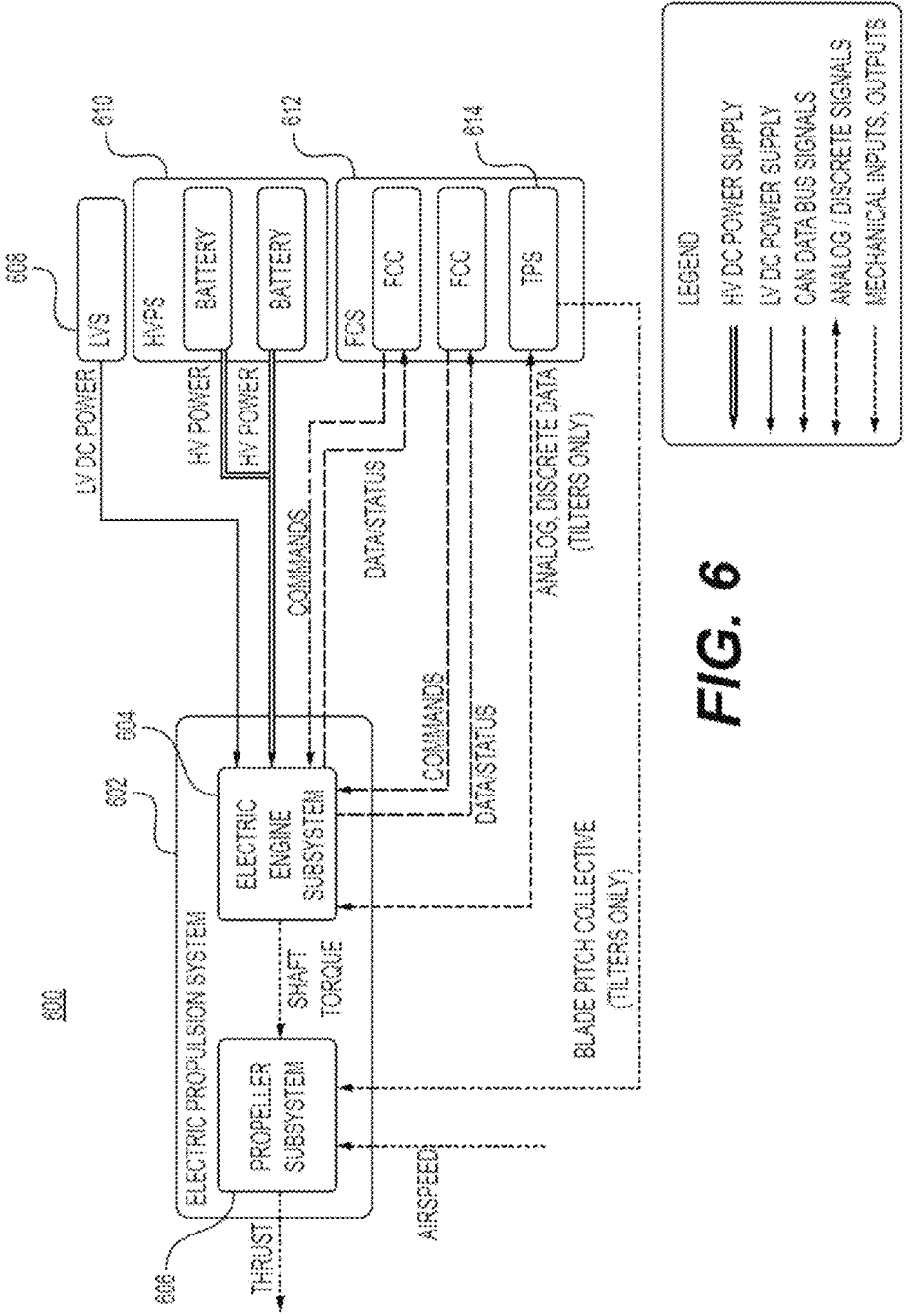
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
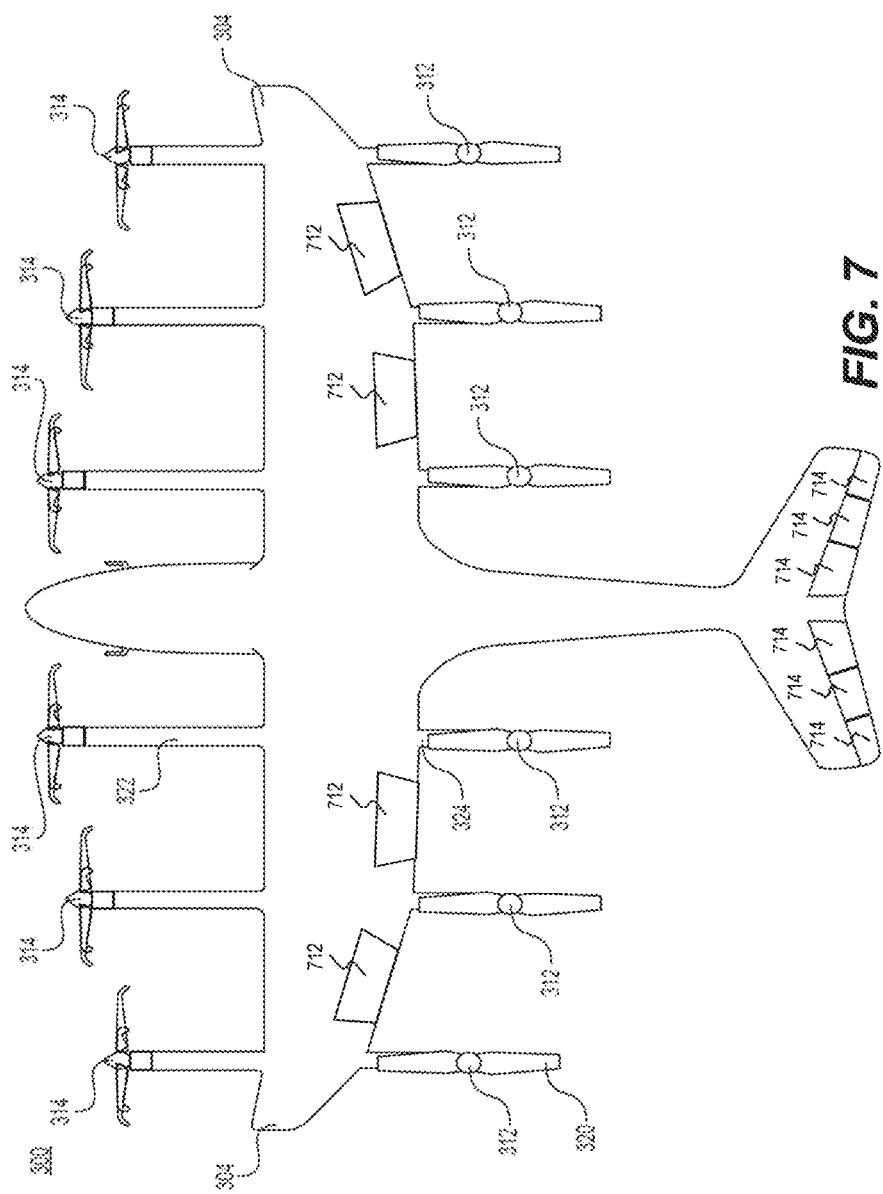
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
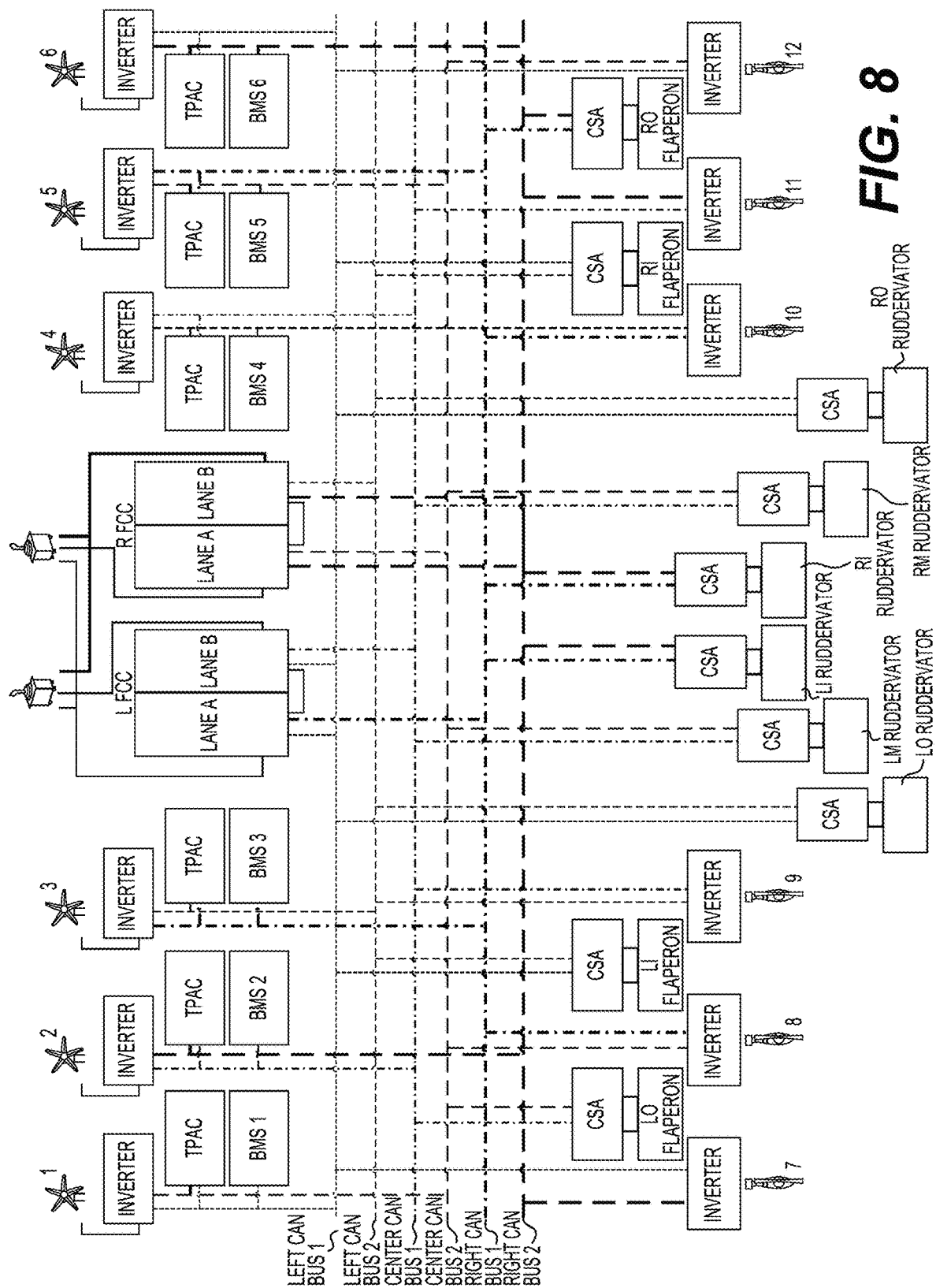
FIG. 8 shows an exemplary flight control signaling architecture, consistent with disclosed embodiments.

FIG. 8 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)—Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9F are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft.

FIG. 9A illustrates an arrangement of electric propulsion units, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (901, 902, 903, 904, 905, and 906) and six aft electric propulsion systems (907, 908, 909, 910, 911, and 912). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion units, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (913, 914, 915, and 916) and four aft electric propulsion systems (917, 918, 919, and 920). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion units, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, and 924 coplanar in a first plane and a second set of two electric propulsion systems 925 and 926 coplanar in a second plane. In some embodiments, the first set of electric propulsion systems 921-924 may be operatively connected to tilt propellers and second set of electric propulsion systems 925 and 926 may be operatively connected to lift propellers. In other embodiments, the first set of electric propulsion systems 921-924 and the second set of aft electric propulsion systems 925 and 926 may all be operatively connected to tilt propellers.

FIG. 9D illustrates an alternate arrangement of electric propulsion units, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, and 930. In some embodiments, all of the electric propulsion systems may be operatively connected to tilt propellers.

FIG. 9E illustrates an alternate arrangement of electric propulsion units, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, and 934 operatively connected to tilt propellers and the two aft ducted fans 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 9F illustrates an alternate arrangement of electric propulsion units, consistent with the embodiments of the present disclosure. Referring to FIG. 9F, the aircraft may be a top plan view of an exemplary aircraft. In some embodiments, the aircraft may include ducted fans 936, 937, 938, and 939 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
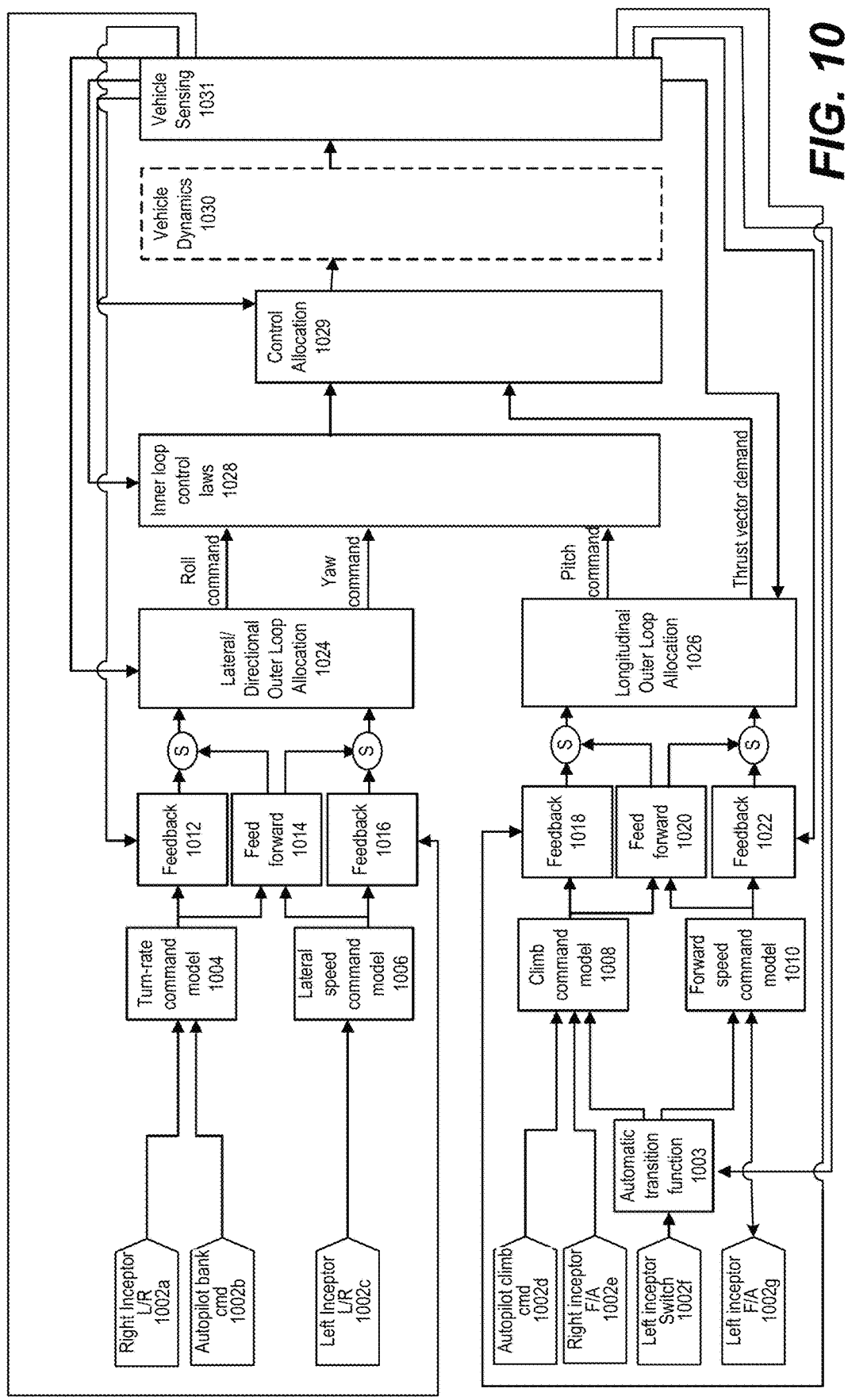
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for ease of description. System 1000 further includes one or more storage mediums storing model(s), function(s), table(s), and/or any information for executing the disclosed processes. As further described below, any or each box indicating a command model (e.g., 1004, 1006, 1008, and 1010), feedback (1012, 1016, 1018, and 1022), feed forward (1014, 1020), Outer Loop Allocation (1024, 1026), inner loop control laws 1028, and control allocation 1029 may represent or include module(s), script(s), function(s), application(s), and/or program(s) that are executed by processor(s) and/or microprocessor(s) of system 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

In some embodiments, control system 1000 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving right inceptor left/right 1002*a* and/or right inceptor forward/aft 1002*c*), left inceptor(s) (e.g., moving left inceptor left/right 1002*e* and/or left inceptor forward/aft 1002*g*), and/or left inceptor switch 1002*f*. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002*b*, autopilot climb command 1002*d*, and/or other command(s) to control the aircraft.

In some embodiments, the one or more inputs may include at least one of a position and/or rate of a right inceptor and/or a left inceptor, signals received (e.g., response type change commands, trim inputs, reference inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, and/or gusts, etc.) based on data (e.g., measurements) received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll command 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb command 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

Each input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008 and 1010 may be configured to determine a shape (e.g., aggressiveness, slew rate, damping, overshoot, etc.) of an ideal aircraft response. For example, each command model of command models 1004, 1006, 1008 and 1010 may be configured to receive and interpret at least one of inputs 1002a, 1002b, 1002c, 1002d, 1002e, 1002f and 1002g and, in response, compute a corresponding change to an aircraft's orientation, heading, and propulsion, or a combination thereof using an integrator (not pictured). In some embodiments, right inceptor L/R 1002a and autopilot roll command 1002b may be fed into turn-rate command model 1004, left inceptor L/R 1002c may be fed into lateral speed command model 1006, autopilot climb command 1002d and right inceptor F/A 1002e may be fed into climb command model 1008, and left inceptor F/A 1002g may be fed into forward speed command model 1010. In some embodiments, an output from automatic transition function 1003 may be fed into at least one of climb command model 1008 or forward speed command model 1010. For example, based on receiving an enable signal from left inceptor switch 1002f, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008 or 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014 and 1020 may be configured to determine the corresponding force using simplified models of aircraft dynamics. For example, based on a known (e.g., a stored value of) or determined mass of the aircraft, feed forward 1014 and 1020 may be configured to determine a force to cause the aircraft to follow a desired acceleration command. In some embodiments, feed forward 1014 and 1020 may be configured to use a model predicting an amount of drag on the vehicle produced as a function of speed in order to determine a force required to follow a desired speed command signal.

Feedback 1012, 1016, 1018, and 1022 may each receive as input the one or more desired changes (e.g., desired position, speed and/or acceleration) from command models 1004, 1006, 1008 and 1010 as well as data received from Vehicle Sensing 1031 indicative of Vehicle Dynamics 1030. For example, sensed Vehicle Dynamics 1030 may comprise the physics and/or natural dynamics of the aircraft, and Vehicle Sensing 1031 sensor measurements may capture how the aircraft moves in response to pilot inputs, propulsion system outputs or ambient conditions. In some embodiments, Vehicle Dynamics 1030 may represent the control of different flight elements (e.g., electric propulsion system(s) and/or control surfaces) and the corresponding effect on the flight elements and aircraft dynamics. Additionally or alternatively, data received from Vehicle Sensing 1031 may include error signals generated, by one or more processors, based on exogenous disturbances (e.g., gust causing speed disturbance). In some embodiments, feedback 1012, 1016, 1018 and 1022 may be configured to generate feedback forces (e.g., at an actuator) based on the received error signals. For example, feedback 1012, 1016, 1018 and 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors may generate an error signal (e.g., included in Vehicle Sensing 1031) which may be looped into feedback 1012, 1016, 1018 or 1022 to determine an additional force needed to correct the error.

In some embodiments, feedback 1012, 1016, 1018 or 1022 may be disabled. For example, in response to losing position and/or ground speed feedback due to disruption of global position system (GPS) communication, system 1000 may be configured to operate without feedback 1012, 1016, 1018 or 1022 until GPS communication is reconnected.

In some embodiments, feedback 1012, 1016, 1018 or 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018 or 1022 may omit that measurement for further processing. For example, in response to one or more processors identifying a heading measurement as invalid, feedback 1012, 1016, 1018 or 1022 may omit subsequent heading measurements in determining feedback force(s).

In some embodiments, feedback 1012, 1016, 1018 or 1022 may determine one or more feedback forces based on actuator state information received from one or more sensors (e.g., included in Vehicle Sensing 1031). For example, in response to actuator state information indicating that there is a failure of an actuator, one or more processors of system 1000 may update one or more processes of System 1000 and determine an alternative command to achieve the desired change. For example, one or more processors of system 1000 may adjust one or more model(s), function(s), algorithm(s), table(s), input(s), parameter(s), threshold(s), and/or constraint(s) in response to the failure of an actuator. Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018 and 1022 and feed forward 1014 and 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/Directional Outer Loop Allocation 1024 and Longitudinal Outer Loop Allocation 1026 may each be configured to receive as input one or more desired forces and data received from Vehicle Sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, weight on wheels, etc.). Based on the inputs, Outer Loop Allocation 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed Vehicle Dynamics (e.g., from Vehicle Sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s).

While the embodiment shown in FIG. 10 includes both Inner Loop Control Laws 1028 and Outer Loop Allocations 1024 and 1026, in some embodiments the flight control system may not include Outer Loop Allocations 1024 and/or 1026. Therefore, a pilot inceptor input may create roll, yaw, pitch, and/or thrust commands. For example, a right inceptor may control roll and pitch and a left inceptor and/or pedal(s) may control yaw and thrust.

Control Allocation 1029 may accept as inputs one or more of force and moment commands, data received from the one or more aircraft sensors, envelope protection limits, scheduling parameter, and optimizer parameters. Control Allocation 1029 may be configured to determine, based on the inputs, actuator commands by minimizing an objective function that includes one or more primary objectives, such as meeting commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. Envelope protection limits may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments or load constraints. In some embodiments, control allocation 1029 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Sensing 1031 may detect the movement of the flight elements and/or the dynamics of the aircraft and provide the information to Feedback 1012, 1016, 1018, 1022, Outer Loop allocation 1024 and 1026, Inner Loop Control laws 1028, and Control Allocation 1029 to be incorporated into flight control.

As described above, Vehicle Sensing 1031 may include one or more sensors to detect vehicle dynamics. For example, Vehicle Sensing 1031 may capture how the aircraft moves in response to pilot inputs, propulsion system outputs or ambient conditions. Additionally or alternatively, Vehicle Sensing 1031 may detect an error in the aircraft's response based on exogenous disturbances (e.g., gust causing speed disturbance). Further, Vehicle Sensing 1031 may include one or more sensors to detect propeller speed, such as a magnetic sensor (e.g., Hall effect or inductive sensor) or an optical sensor (e.g., a tachometer) configured to detect the rotor speed of the aircraft engine (and thereby the speed of the propeller). Vehicle sensing 1031 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 1000. Further, one or more pitot tubes, accelerometers, and/or gyroscopes may detect a pitch angle of the aircraft, which may be provided to system 1000. In some embodiments, Vehicle Sensing 1031 may combine tilt angle sensor measurements and aircraft pitch measurements to determine an overall nacelle tilt angle for the propellers. Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle sensing 1031 may include one or more sensors configured to detect vehicle dynamics, such as acceleration and/or pitch orientation sensors (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components.

In some embodiments, Vehicle Sensing 1031 may include an inertial navigation system (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

Figure 11:
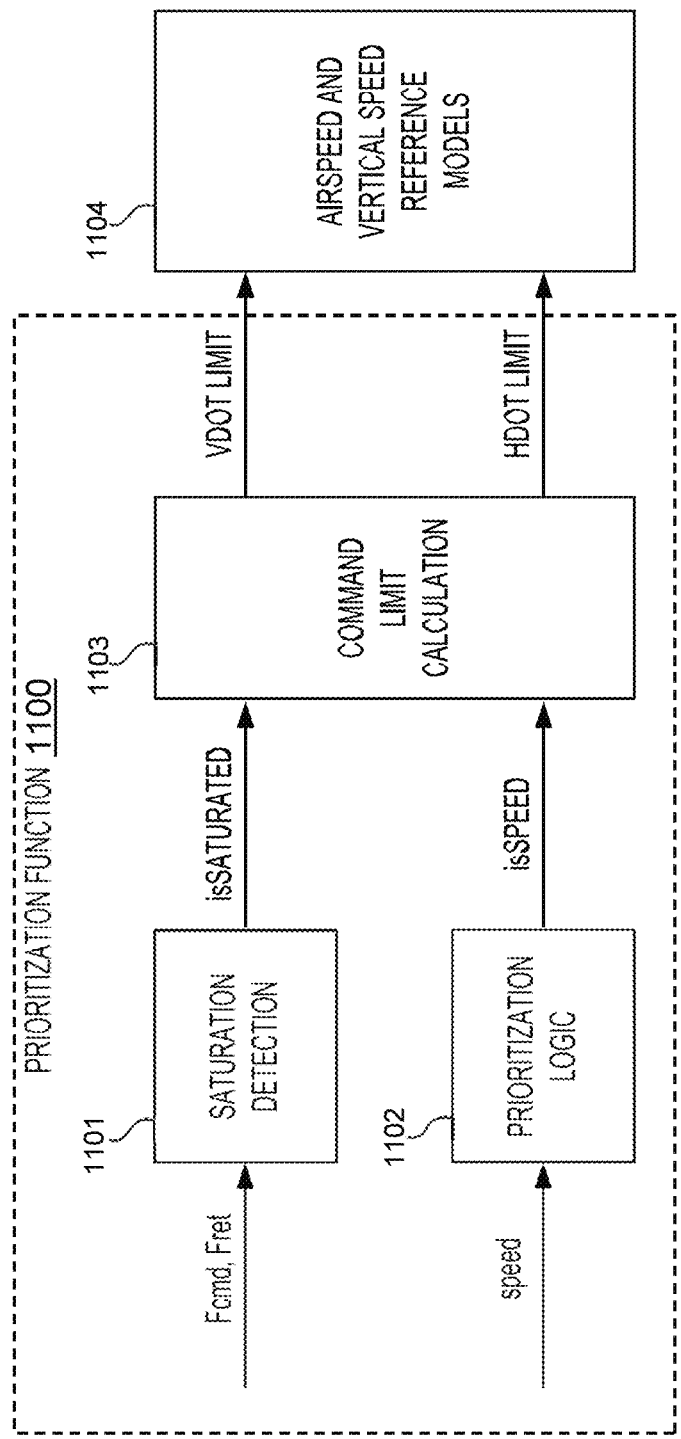
FIG. 11 illustrates a functional block diagram of an exemplary implementation of an exemplary system for prioritization of airspeed or climb.

FIG. 11 illustrates a functional block diagram of an exemplary implementation of prioritization function 1100 for prioritization of airspeed or climb according to some embodiments of the present disclosure. Prioritization function 1100 may be configured to determine priority of command realization between pilot command components relating to airspeed and climb of the aircraft. Prioritization function 1100 may be implemented by at least one processor (e.g., at least one a microprocessor-based controller) configured to execute software code stored in a storage medium (e.g., a computer-readable medium, a non-transitory computer-readable medium) to implement the functions described herein. Prioritization function 1100 may also be implemented in hardware, or a combination of hardware and software. Prioritization function 1100 may be implemented as part of a flight control system of the aircraft (e.g., part of FCS 612 in FIG. 6, or part of system 1000, such as Longitudinal Outer Loop Allocation 1026 in FIG. 10) and may be configured to perform a single step or sequence repeatedly until a desired or commanded outcome is achieved. The boxes shown in FIG. 11 may represent any combination of software and/or modules, such as devices, programs, systems, subsystems, logic, models, and/or functions. For example, each box may represent a portion of software code that is executable by at least one processor (e.g., of system 1000), such as according to instructions stored on at least one computer-readable medium. It is appreciated that the complexity and interconnectedness of the functionality described with respect to FIG. 11 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 11 (with or without functionality described with respect to other figures, such as FIGS. 12, 13, 14, 15, 16, 17, 18 and/or 19), including improved aircraft safety and reduced pilot workload, as well as, for example, enhanced flight path efficiency and/or reduction of aircraft physical component stress.

Prioritization function 1100 may comprise one or more saturation detection subsystems 1101 (e.g., modules, devices, programs, etc., also referred to as saturation detection), prioritization logic 1102 and command limit calculation module 1103. Saturation detection 1101 may determine (e.g., receive as input, calculate, interpret, and/or measure) forces, moments, as well as actuator and effector limits to determine whether execution of one or more inputs associated with the pilot command (some examples of which are discussed above) violates any predetermined limits. In one example, implementation of an input associated with a pilot command may require exceeding total power available for tilt propellers or may violate operational limits of one of the actuators. Saturation detection 1101 may determine (e.g., receive as input, calculate, interpret, and/or measure) at least one input associated with every pilot command to determine whether any operational limits will be (e.g., are predicted to be) violated by implementation of the corresponding commands.

Prioritization logic 1102 may be configured to determine priority of execution of different components of the input associated with the pilot command based on the data received from Vehicle Sensing 1031 indicative of Vehicle Dynamics 1030. Prioritization logic 1102 may determine a priority for executing airspeed and/or climb components of the input associated with the pilot command.

Based on the outputs of saturation detection 1101 and prioritization logic 1102, command limit calculation module 1103 may determine whether to prioritize airspeed or climb based on the input indicative of pilot command. For example, prioritization function 1100 may determine a force saturation in saturation check 1101 and consequently may determine whether to prioritize airspeed or climb components of input associated with the pilot command (or vice versa). Command limit calculation module 1103 may calculate a longitudinal acceleration limit and a vertical speed limit (e.g., as a result of determining the priority of execution). These calculated command limits may be output to airspeed and vertical speed reference models module 1104 for generating an aircraft desired response within the two limits determined from command limit calculation 1103.

Figure 12:
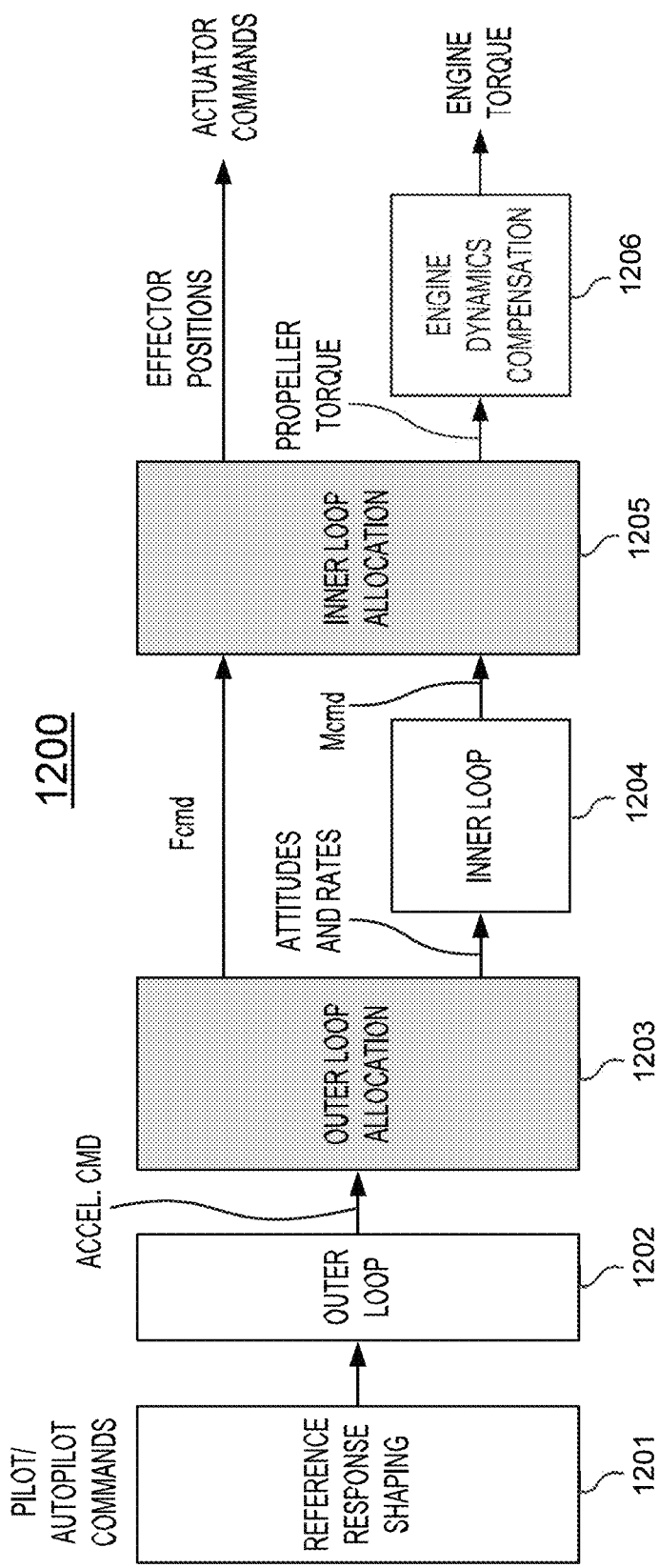
FIG. 12 illustrates a functional block diagram of an exemplary implementation of a prioritization system in an aircraft.

FIG. 12 illustrates a block diagram of an exemplary command prioritization system 1200, which may be implemented in an aircraft. The boxes shown in FIG. 12 may represent any combination of software and/or modules, such as devices, programs, systems, subsystems, logic, models, and/or functions. For example, each box may represent a portion of software code that is executable by at least one processor (e.g., of system 1000), such as according to instructions stored on at least one computer-readable medium.

It is appreciated that the complexity and interconnectedness of the functionality described with respect to FIG. 12 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 12 (with or without functionality described with respect to other figures, such as FIGS. 11, 13, 14, 15, 16, 17, 18 and/or 19), including improved aircraft safety and reduced pilot workload, as well as, for example, enhanced flight path efficiency and/or reduction of aircraft physical component stress.

In the present example, reference response shaping 1201 may be configured to translate a command issued by a pilot into one or more inputs indicative of pilot command that may be expressed in terms of physical response parameters, including but not limited to forces, moments, accelerations, velocities, and/or other parameter that may represent one or more outputs generated by the aircraft in response to at least one pilot command.

The inputs indicative of pilot command (some examples of which are discussed above) may be input from reference response shaping 1201 to outer loop 1202. In some embodiments of the present disclosure, outer loop may refer to a higher-level control layer configured to manage a trajectory and stability of an aircraft relating to position, speeds, altitude etc. Outer loop 1202 may be configured to receive the pilot command and analyze the pilot command to determine one or more characteristics associated with the pilot command, which may relate to airspeed and climb of the aircraft. For example, a characteristic associated with the pilot command may include at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft. In some embodiments, the characteristics of pilot commands may also relate to at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft. Outer loop 1202 may be configured to determine characteristics associated with the pilot command and may transform them into a response vector, which may be represented by vertical and lateral acceleration or force commands.

In some embodiments, command prioritization may include performing at least one saturation check based on the pilot command and calculating a command limit based on the at least one saturation check. For example, acceleration commands generated by outer loop 1202 may be input to outer loop allocation 1203, where a first saturation check may be carried out on the response vector. In some embodiments, the first saturation check carried out by outer loop allocation may consider saturation of vertical and longitudinal acceleration commands. The saturation check may require conversion of acceleration commands into force and pitch commands and may result in determination of a command limit that may be imposed at least one of airspeed or climb acceleration commands. If the first saturation check detects saturation, outer loop allocation 1203 may return an indication (e.g. a memory flag or notification) that saturation may be detected, and that the aircraft may not be able to fully execute the longitudinal acceleration command. The first saturation check is described in more detail with respect to FIG. 13.

In some embodiments, the output of outer loop allocation 1203 may comprise attitudes and rates associated with at least one of roll, yaw and pitch of the aircraft. These attitudes and rates may be input to inner loop 1204. In some embodiments of the present disclosure, inner loop 1204 may refer to the lower-level control layer that manages stabilization and control of the aircraft's attitude and rotational rates. Inner loop 1204 may convert attitudes and rates received from outer loop allocation into moment commands, which may be input to inner loop allocation 1205. Converting the attitudes and rates into moment commands may comprise calculating deviations of current attitudes and rates from the desired values and translation of the calculated deviations into rectifying moment commands, for example via control laws that may utilize Proportional-Derivative (PD) or Proportional-Integral-Derivative (PID) control strategies.

Inner loop allocation 1205 may be configured to perform a second saturation check based on force commands received from outer loop allocation 1203 and moment commands from inner loop 1204. The second saturation check performable by inner loop allocation 1205 may comprise checking for saturation from the perspective of actuators and effectors. Upon completion of the second saturation check, inner loop 1205 may return effector and actuator commands. An exemplary second saturation check is described in more detail with respect to FIG. 14.

Moreover, inner loop allocation 1205 may output (e.g., return) torque commands, which may be input to engine dynamics compensation 1206, which may be configured to perform a saturation check of the torque commands. For example, in some embodiments the saturation check performed by engine dynamics compensation module 1206 may determine if a thrust demand for at least one propeller of the aircraft is saturated (e.g., if the at least one propeller cannot output thrust that is at least equal to the thrust demand). Following the check, engine dynamics compensation 1206 may determine that one or more torque commands received from inner loop allocation 1205 will exceed (e.g., are predicted or calculated to exceed) at least one capability of a propeller and/or rotor, and may (e.g., based on the determination) reduce the torque command for execution by one or more components (e.g., effectors).

Figure 13:
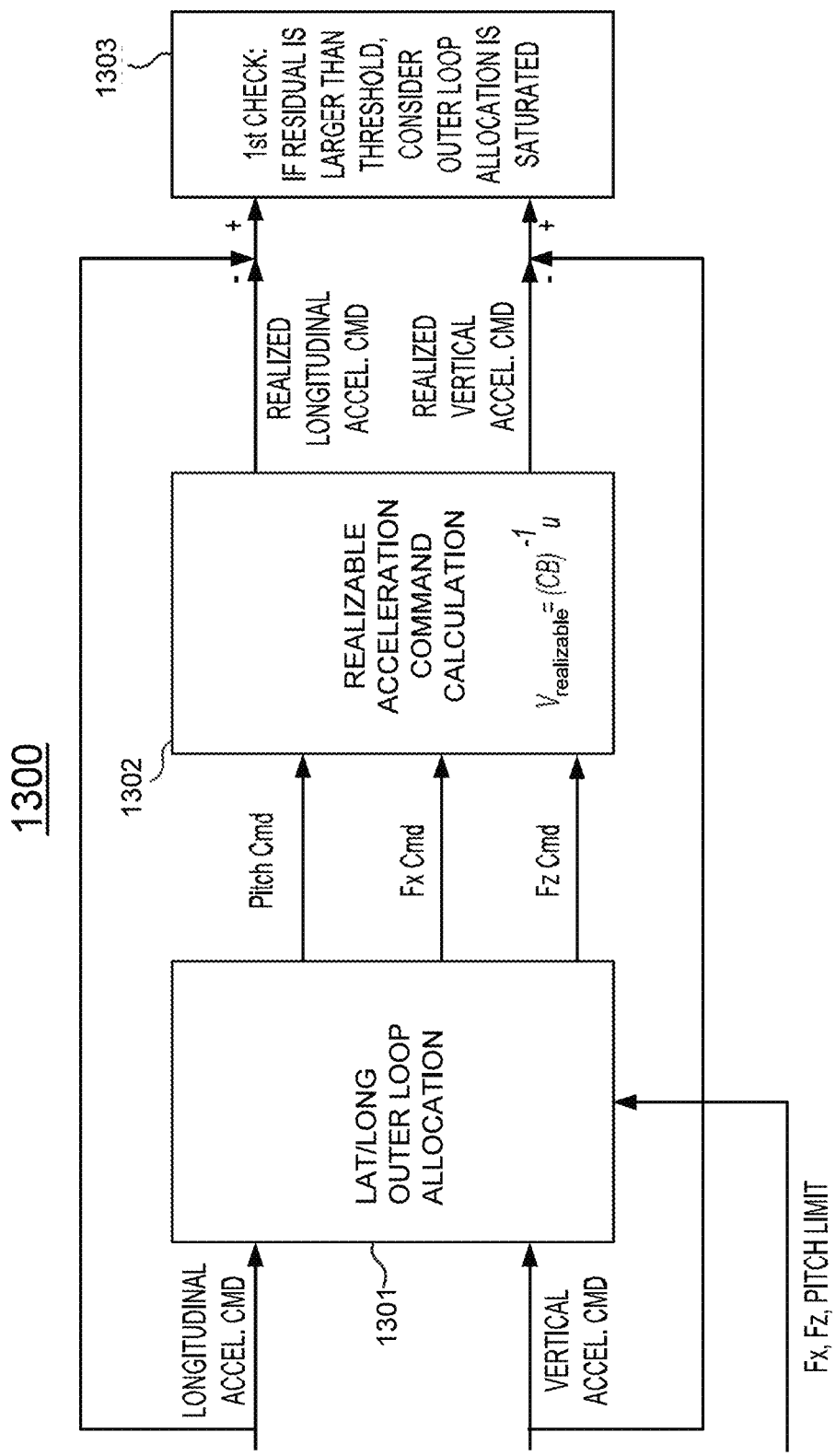
FIG. 13 shows a functional block diagram of an exemplary first saturation check performable by outer loop allocation.
Figure 14:
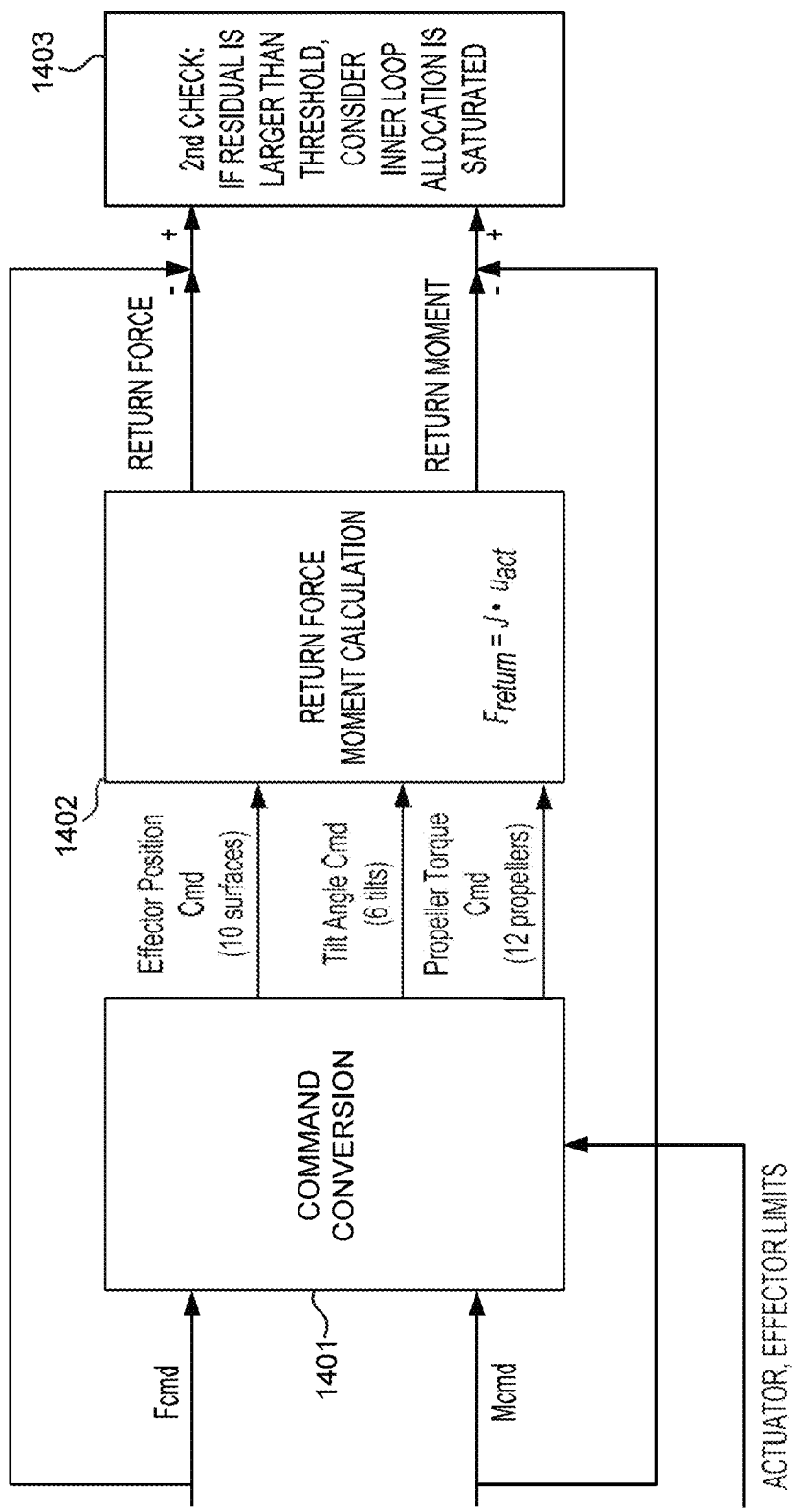
FIG. 14 shows a functional block diagram of an exemplary second saturation check performable by inner loop allocation.

FIG. 13 shows a functional block diagram of an exemplary first saturation check 1300 performable by outer loop allocation 1203, comprising directional outer loop allocation 1301, realizable command calculation 1302 and first saturation check 1303. It is appreciated that the complexity and interconnectedness of the functionality described with respect to FIG. 13 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 13 (with or without functionality described with respect to other figures, such as FIGS. 11, 12, 14, 15, 16, 17, 18 and/or 19), including improved aircraft safety and reduced pilot workload, as well as, for example, enhanced flight path efficiency and/or reduction of aircraft physical component stress.

Lateral/longitudinal outer loop allocation 1301 may receive vertical and longitudinal acceleration commands, as well as corresponding command limits from outer loop 1202. In some embodiments, longitudinal and vertical acceleration commands corresponding to the pilot command may be converted into at least one of a pitch command, a force command, or a moment command. In one example, based on the commands and limits received from outer loop 1202, Lateral/longitudinal outer loop allocation 1301 may translate longitudinal and vertical acceleration commands into corresponding pitch and force commands. Realizable acceleration command calculation 1302 may receive pitch and force commands from Lateral/longitudinal outer loop allocation 1301 and may translate them into realizable longitudinal and vertical acceleration commands.

In some embodiments, realizable acceleration commands may be understood as commands that may be achieved within a set of force and pitch limits provided by outer loop 1202. In some embodiments, performing first saturation check 1303 may comprise comparing acceleration commands provided by outer loop 1202 and realizable acceleration commands based on imposed force and pitch limits. If the magnitude of realizable acceleration commands in smaller than the magnitude of acceleration commands received from outer loop 1202, first saturation check 1303 may provide an indication of saturation. An indication of saturation may include at least one flag, at least one error message, at least one warning, at least one log, an expression of a proximity of a command demand to a capability of at least one aircraft component, any of which may be stored in the system's memory and/or communicated to other parts of the system.

Following the first saturation check, which may be related to a saturation of the longitudinal acceleration command, some embodiments may include a second saturation check, which may be related to execution of climb command, such as by examining effector and/or actuator commands. The second saturation check may take place in (e.g., be performed or executed by) inner loop allocation 1204 and is illustrated by a functional block diagram in FIG. 14. It is appreciated that the complexity and interconnectedness of the functionality described with respect to FIG. 14 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 15 (with or without functionality described with respect to other figures, such as FIGS. 11, 12, 13, 14, 15, 16, 17, 18, 19 and/or 20), including improved aircraft safety and reduced pilot workload, as well as, for example, enhanced flight path efficiency and/or reduction of aircraft physical component stress.

Command conversion 1401 may receive one or more force commands (e.g., from outer loop allocation 1203) and one or more moment commands (e.g., from inner loop 1204). Command conversion 1401 may also receive one or more effector and actuator limits (e.g., from inner loop 1204). Command conversion 1401 may convert force and moment commands into corresponding effector, tilt and torque commands. In some embodiments, command conversion 1401 may convert force and moment commands into corresponding effector, tilt and torque commands based on the effector and actuator limits provided by inner loop 1203. For example, converting force and moment commands into corresponding effector, tilt and torque commands may include mapping of forces and moments to corresponding effectors responsible for producing these forces and/or moments and/or solving for effector commands based on a matrix mapping the relationship between effector deflections and resulting forces and/or moments.

The output from command conversion 1401 may be received by return force-moment calculation 1402, which may convert effector, tilt and torque commands into return forces and moments (e.g., based on the received output from command conversion 1401). Converting the effector, tilt and torque commands into return forces and moments may include a mathematical transformation based on control allocation matrix which allows for mapping of effector displacement contributions onto generated forces and commands. In some embodiments, return forces and moments may be understood as forces and moments that may be realized within the limits imposed by actuators and effectors. Return force commands may be calculated according to equation (1), where $F_{return}$ denotes return force, J indicates a Jacobian matrix that may represent rates of change of forces and moments in response to changes in the control inputs, and $u_{act}$, which may describe actuator displacement vector.

$$F_{return} = J \cdot u_{act} \qquad (1)$$

Return moment may be subsequently derived from return force.

In some embodiments, return force and moment commands may be compared (e.g., within second saturation check 1403) to force and moment commands received from outer loop allocation 1203 and inner loop 1204 respectively. In some cases, the magnitude of input force and moment may exceed the magnitude of realizable force and moment output by return force-moment calculation 1402. In such instance, for example, second saturation check 1403 may provide indication of saturation of the climb command. An indication of saturation may include one or more of: at least one flag, at least one error message, at least one warning, at least one log, or an expression of a proximity of a command demand to a capability of at least one aircraft component, any of which may be stored in the system's memory and/or communicated to other parts of the system.

Figure 15:
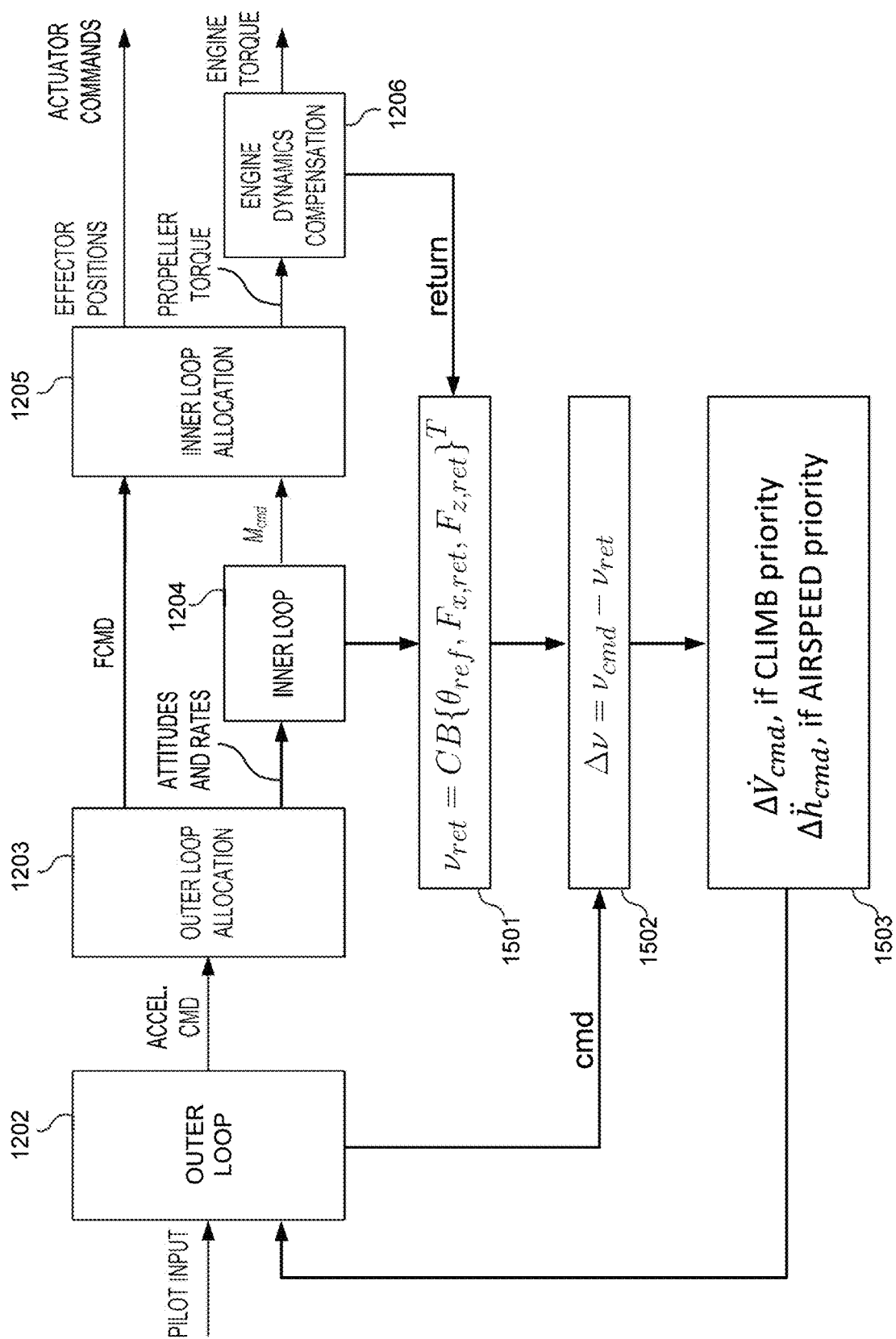
FIG. 15 illustrates a functional block diagram of an exemplary implementation of a method for command prioritization in an aircraft with a corresponding feedback loop for continuous command verification.

Prioritization system 1100 may operate continuously to ensure safe execution of pilot commands. FIG. 15 illustrates a functional block diagram of an exemplary implementation of a method for command prioritization in an aircraft with corresponding feedback loop for continuous command verification. It is appreciated that the complexity and interconnectedness of the functionality described with respect to FIG. 15 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 15 (with or without functionality described with respect to other figures, such as FIGS. 11, 12, 13, 14, 15, 17, 18, 19 and/or 20), including improved aircraft safety and reduced pilot workload, as well as, for example, enhanced flight path efficiency and/or reduction of aircraft physical component stress.

As described with reference to FIG. 12, a pilot command (examples of which are discussed above) may be translated into inputs indicative of pilot command that may be expressed in terms of physical response parameters by reference response shaping 1201. Outer loop 1202 may receive the input indicative of pilot command and transforms it into a response vector, which may be represented by vertical and lateral acceleration commands.

Outer loop allocation 1203 may perform first saturation check based on acceleration commands received from outer loop 1202 as described with reference to FIG. 13 and may execute a prioritization function to assign priorities and reduce at least one of airspeed or climb components based on assigned priorities of execution. Outer loop allocation 1203 may convert acceleration commands into force commands that may be input to inner loop allocation 1205.

Converting the acceleration commands into force commands may include mathematical transformations based on second law of dynamics. Moreover, in some embodiments, the output of outer loop allocation may also comprise attitudes and rates associated with at least some of roll, yaw and pitch of the aircraft. These attitudes and rates may be input to inner loop 1204, which may be converted to moment commands. Converting the attitudes and rates into moment commands may include calculating deviations of current attitudes and rates from the desired values and translation of the calculated deviations into rectifying moment commands, for example via control laws that may utilize Proportional-Derivative (PD) or Proportional-Integral-Derivative (PID) control strategies.

Inner loop allocation 1205 may receive moment commands from inner loop 1204 and force commands from outer loop allocation 1203 to generate effector, actuator and torque commands for propellers and/or rotors, following a second saturation check, for example. In some embodiments, torque commands may require an additional saturation check by engine dynamics compensation module 1206.

Return acceleration commands ($v_{ret}$) 1501 may include a combination of one or more acceleration commands for the aircraft (e.g., associated with one or more engines). For example, return acceleration commands ($v_{ret}$) 1501 may include a combination of the output of inner loop 1204 and the output of engine dynamics compensation module 1206. Return acceleration command 1501 may be derived from force and pitch components of the command realizable by the aircraft, for example, according to equation (2), where C denotes observation matrix for converting forces into accelerations, B represents aircraft dynamical models, $\theta_{ref}$ denotes attitude reference and $F_{x,ret}$, $F_{z,ret}$ stand for calculated returned longitudinal and vertical forces from inner loop allocation 1204 based on actual generated actuator commands.

$$v_{ret} = CB\{\theta_{ref}, F_{x,ret}, F_{z,ref}\}^T \qquad (2)$$

Return acceleration command 1501 and an initial command indicative of pilot input may be compared to calculate a correction factor that may be referred to as command offset or command delta ($\Delta v$) 1502. The original command indicative of pilot input may be provided by outer loop reference models and feedback module (or feedback module for short), comprised in outer loop 1202. Command delta 1502 may represent deviation of any aspect of return command 1601 from the original command indicative of pilot input.

Based on the outcome of the first saturation check (e.g., as discussed with respect to FIG. 13) and the second saturation check (e.g., as discussed with respect to FIG. 14), the command delta may be applied to airspeed or climb depending on the determined priority of execution. If, based on present flight conditions and state of flight parameter, prioritization logic 1102 determines climb command may have priority of execution, then command delta 1502 may be applied to airspeed command. Otherwise, prioritization logic 1102 may determine that airspeed has priority of execution and command delta 1502 may be applied to climb component.

Following command delta 1502 implementation and in the absence of new commands, for example, updated commands 1503 may be input back to outer loop 1202 to repeat the cycle of analysis as described above, where the output of outer loop 1202 is input into outer loop allocation 1203, which in turn delivers commands to inner loop 1204 and inner loop allocation 1205 etc. The feedback loop may provide functionality of continuous command verification, as the conditions relating to aircraft's ability to fulfill these commands may change over time due to changes in environmental conditions, state of flight parameters, failures or any other consideration that may affect flight of the aircraft.

Figure 16:
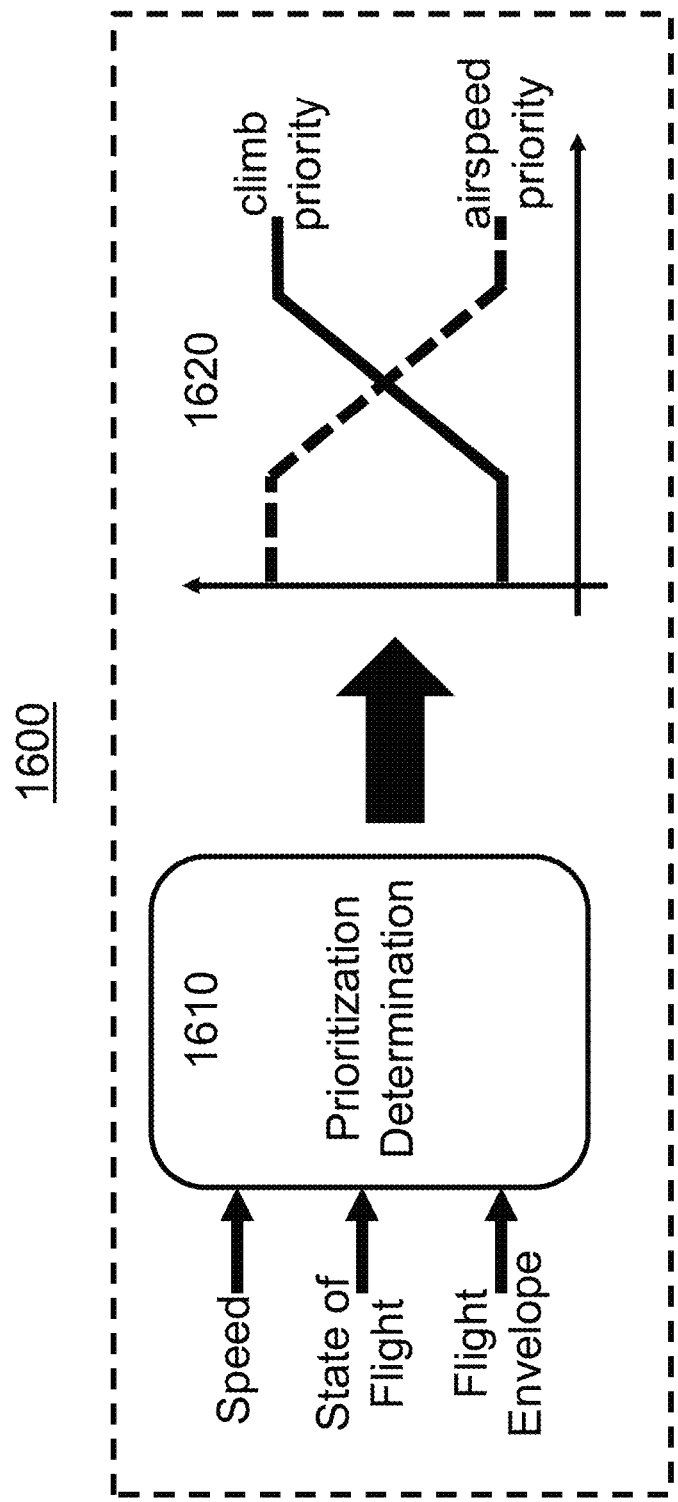
FIG. 16 shows a schematic diagram of an alternative implementation of the prioritization function.

In one embodiment of a prioritization function, a method of command prioritization may be performed mostly or entirely in outer loop allocation 1203 and may be based on (e.g., rely on) a weighting factor assignment to airspeed and climb components of pilot command. FIG. 16 shows a schematic representation of prioritization 1600 according to some aspects of present disclosure. Prioritization function 1600 may be implemented in prioritization system 1200 and its execution may take place in outer loop allocation 1203 without need for saturation checks as described with reference to FIG. 13 and FIG. 14.

As shown in FIG. 16, prioritization function 1600 may be configured to assign weights to characteristics associated with the pilot command based on constraint data. The constraint data may be based on state of flight of the aircraft or other integrity parameters. For instance, in some embodiments the constraint data may be based on at least one of a current state of flight, an integrity threshold of at least one actuator, a failure scenario of at least one effector of the aircraft, state of flight, or at least one limit from a flight envelope of the aircraft. A state of flight of an aircraft may comprise at least one of an airspeed of the aircraft, an altitude of the aircraft, a propeller tilt angle of at least one propeller of the aircraft, a pitch angle of the aircraft, a bank angle of the aircraft, a rotor speed, a flight envelope of the aircraft, any parameter indicating a condition of at least one aircraft component, or any combination of flight conditions, as described above (e.g., prior to the description of FIG. 1). In some embodiments, a state of flight of an aircraft may include a group of multiple combinations of parameters, such as a "hover" state of flight, a "transition" state of flight (e.g., a state indicating the aircraft is transitioning between a hover mode and a cruise mode), or a "cruise mode" state of flight (e.g., forward flight mode, conventional flight mode). The constraint data may be defined based on (e.g., may include) at least one of a flight safety envelope, a physical limit of operation of at least one actuator of the aircraft, a physical limit of operation of at least one effector of the aircraft, or a saturation check. For example, the constraint data may comprise a minimum airspeed to prevent stall of the aircraft (e.g., to ensure safe operation of the aircraft).

As shown in FIG. 16, a prioritization function may comprise prioritization determination 1610, which may be configured to determine a priority of execution of commands between (e.g., relative to) airspeed and climb based on the constraint data, while weight assignment 1620 may assign weights or weighting factors to commands associated with vertical and longitudinal acceleration components. In the present embodiment, weighting factors may be expressed on continuous scale that may not require complete prioritization of airspeed or climb (e.g., prioritizing airspeed to the exclusion of climb), but depending on the constraint data (e.g. airspeed, flight envelope, state of flight) one component may be assigned higher priority than another and the resulting command delta (e.g. command delta 1503) may be applied to both airspeed and climb command according to weighting factors assigned.

Figure 17A:
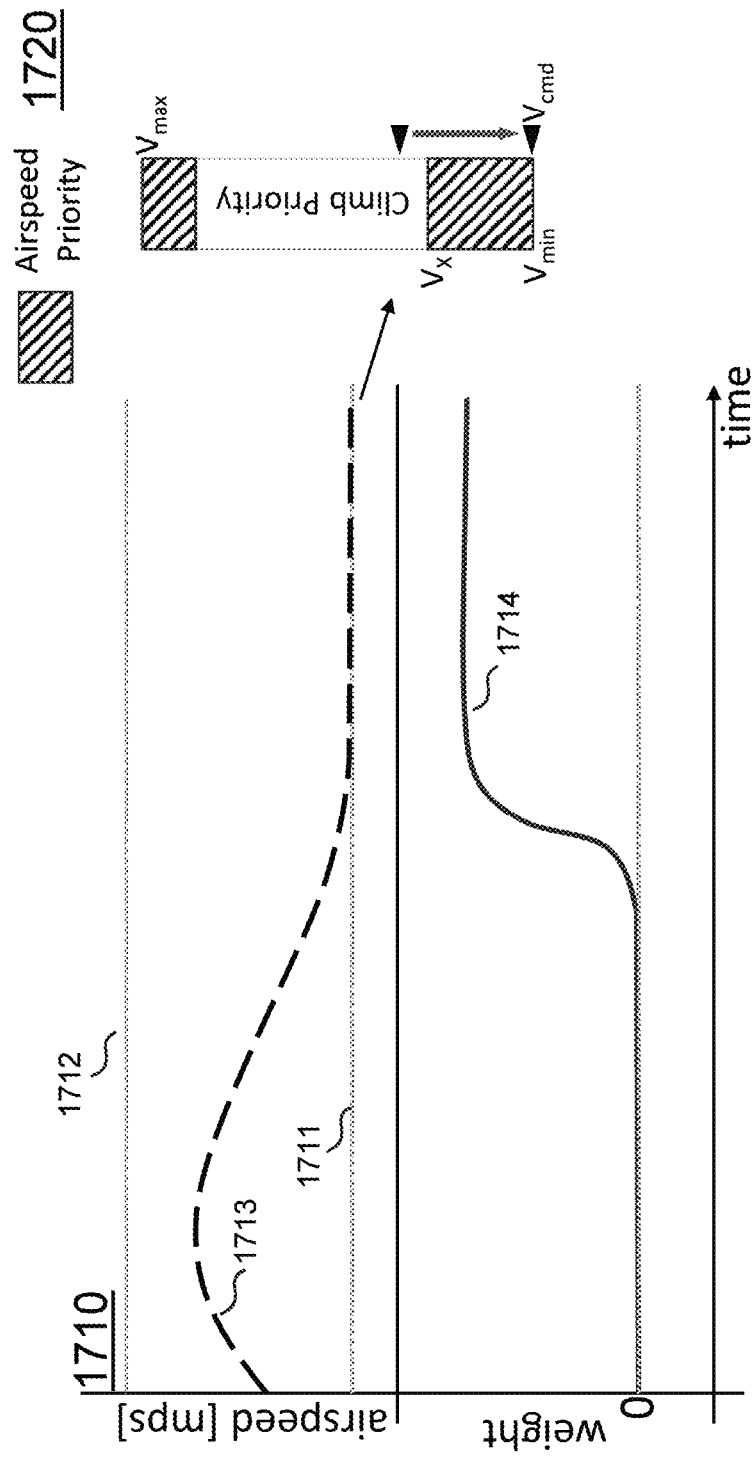
FIGS. 17A, 17B, and 17C illustrate examples of implementation of determining a weighting factor based on variation in airspeed of a vehicle.
Figure 17B:
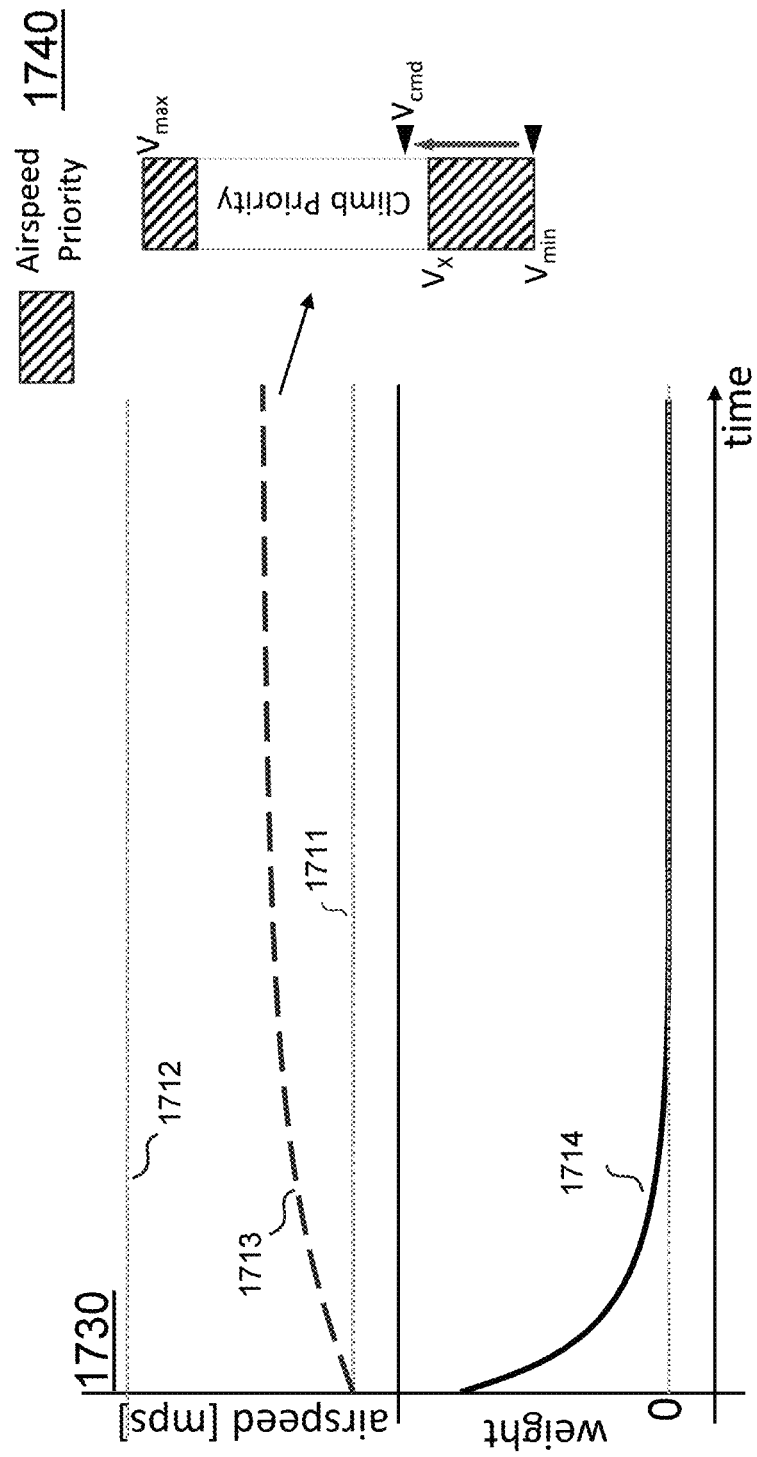
Figure 17C:
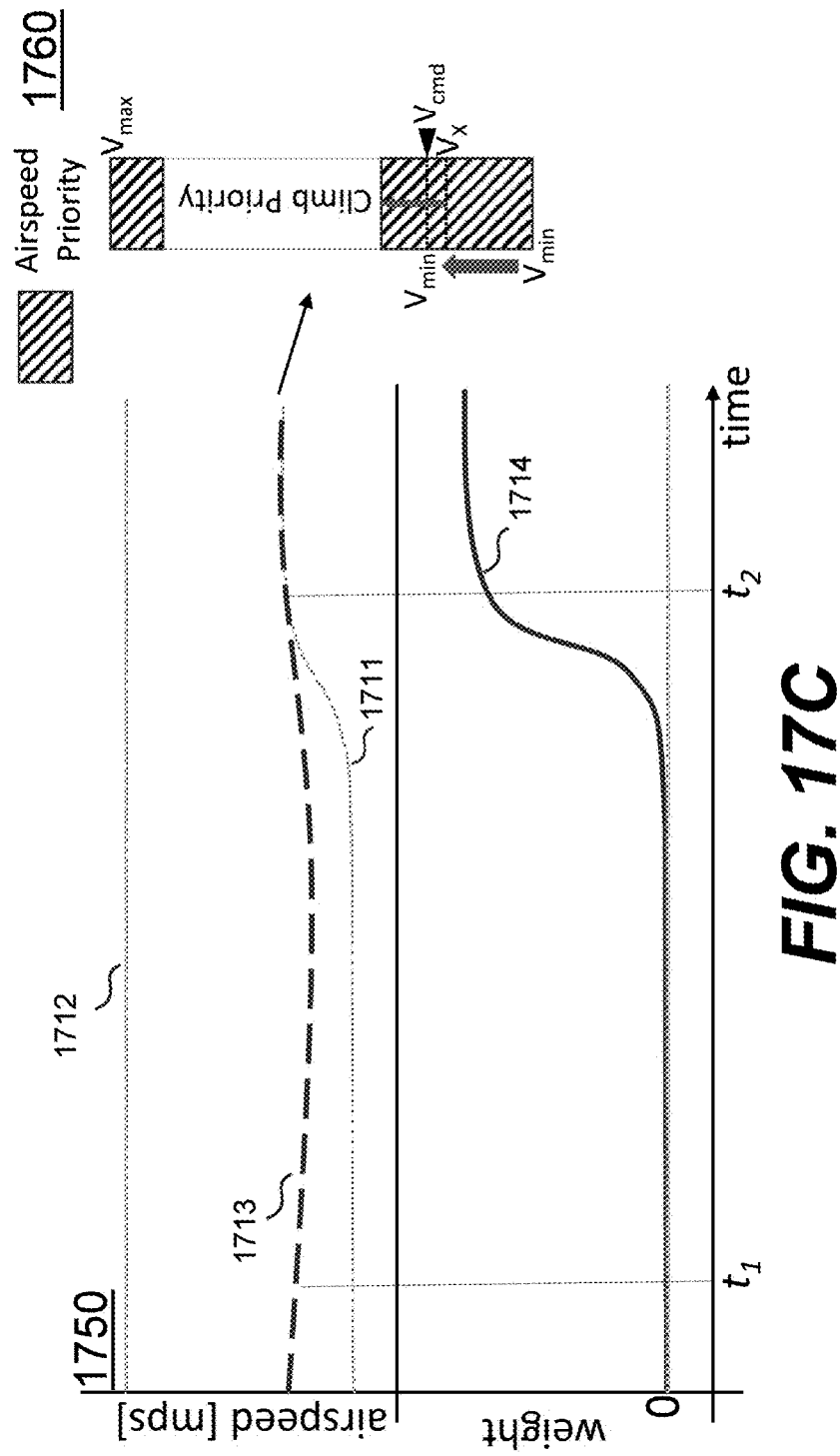

FIGS. 17A-C illustrate graphical examples of implementation of a weighting factor based on variation in airspeed of an aircraft, which may be achieved using system 1000 and/or the operations described with respect to, for example, FIGS. 12 and 16. Based on an airspeed (e.g., current airspeed of the aircraft) and/or changes of the airspeed with respect to upper and lower limits, a prioritization function may decide to allocate higher priority of execution (weight) to acceleration command associated with airspeed or to acceleration command associated with climb.

Graph 1710 in FIG. 17A shows variation of airspeed 1713 (also shown as $V_{cmd}$ in panel 1720) and corresponding weighting factor 1714 assigned to airspeed by prioritization function over time. Flight control system may require operation of an aircraft within certain limits that may be based on safety considerations and equipment limitation. Thus, airspeed 1413 may be restricted to operating within lower limit ($V_{min}$) 1711 and upper limit 1712 ($V_{max}$), which may represent operational constraints. A flight control system (e.g., system 1000) may ensure that neither of these limits is breached. During aircraft operation airspeed 1713 may drop to lower speed limit 1411, resulting in weighting factor 1714 increasing significantly in response to airspeed approaching lower airspeed limit 1711. As indicated in panel 1720, reduction in airspeed 1713 to the level of lower limit 1711 results prioritization of airspeed commands over climb commands.

Panel 1730 in FIG. 17B illustrates a situation where airspeed 1713 initially remains at lower limit 1711 and then gradually increases over time, for instance based on (e.g., as a result of) an issued longitudinal acceleration command. Consequently, prioritization function may reduce a weighting factor 1714 assigned to airspeed as it moves through the region of airspeed prioritization across the speed threshold $V_x$ into a climb prioritization region, as shown in panel 1740.

However, lower and upper limits 1711. 1712 need not remain stationary and in some scenarios these limits may also change over time (e.g., may be changed by at least one processor or FCC over time), affecting weighting factor assignment (and also contributing to the complexity of determining a weighting factor). FIG. 17C illustrates a situation where airspeed 1713 remains relatively constant, while lower limit 1711 increased over time. An increase in minimum airspeed may result from pilot commanding a maneuver, for example a bank turn, which may require increased airspeed for execution within one or more constraints or limits (e.g., for safe execution). As illustrated in panel 1750, the increase in lower limit 1711 around time 12 may result in significant increase in weighting factor 1714 assigned to airspeed component of the pilot command. As shown in panel 1760, an airspeed value that may lie in the climb priority region at time ty may appear at lower limit time 12 due to lower airspeed limit 1711 moving upwards.

In some embodiments, the relationship between weights assigned to airspeed and climb may be based on (e.g., defined by) a mathematical algorithm where both weighting factors are related to one another. In some embodiments, the weights assigned to the characteristics associated with the pilot command may comprise two weights that are negatively correlated with each other. For example, an increase in a weighting factor assigned to airspeed may correspond to a decrease in the weighting factor assigned to climb. In some embodiments, the weights and consequently the priority of execution between airspeed and climb may expressed by a linear function, while in other embodiments it may be expressed by a non-linear function.

In some embodiments, an optimization algorithm may be configured to use weights assigned to the characteristics associated with the pilot command to determine which characteristic (or combination of characteristics) may be adjusted more heavily (e.g., relative to other characteristics) in a minimization process (e.g., potential subsequent minimization process). For example, prioritization function 1600, which may operate within (e.g., as part of) outer loop allocation 1203, may perform a saturation check to determine whether original input indicative pf pilot command may be realized within constraint data, for example based on at least one of airspeed, state of flight or flight envelope. In some embodiments, if the original command may not be realized within the limits dictated by the constrain data, prioritization function may assign weighting factors and calculate a correction factor to be applied to the characteristics associated with the pilot command based on determined priority. For example, following at least one saturation check and weighting factor assignment (e.g., within outer loop allocation 1203), acceleration and/or force commands generated by outer loop allocation 1203 may be adjusted, for example by minimization analysis based on priority of execution of between airspeed and climb. Prior to the input of force commands to inner loop allocation 1205, the magnitude of these commands may be reduced in line with (e.g., based on, using, correlated with, proportional to) the outcome of the minimization analysis. In some embodiments, generating at least one actuator command to control the aircraft based on determined priority of execution, discussed further herein (e.g., with respect to FIG. 18), may be based on the output from inner loop allocation 1205.

In the present embodiment, the output of outer loop allocation 1203 may be forwarded to inner loop 1204 and inner loop allocation 1205 as described with reference to FIG. 12. Inner loop allocation may not be required to perform another saturation check as prioritization function may determine that both airspeed and climb commands require adjustment to avoid saturation and outer loop allocation 1203 may output commands within the constraint data which may be based on at least one of a current state of flight, an integrity threshold of at least one actuator, a failure scenario of at least one effector of the aircraft, state of flight, or at least one limit from a flight envelope of the aircraft as described above.

The method for command prioritization as described above with reference to FIGS. 12-17 may be implemented into a system, e.g. flight control system 612 in FIG. 6. The system may comprise a plurality of actuators, where at least one actuator (e.g., each of the actuators) may be coupled to at least one effector and/or at least one processing unit configured to carry out the method for command prioritization in an aircraft. Moreover, in some embodiments the method described above with reference to any or all of FIGS. 12-17 may be implemented in an aircraft, for example aircraft 100 of FIG. 1. The aircraft may comprise fuselage 102, at least one wing (e.g. wing 104) mounted to fuselage 102, at least one stabilizer mounter to the rear of the fuselage (e.g. stabilizer 106) and a plurality of propellers mounted to the at least one wings (e.g. propellers 114), where at least one of the propellers may be tiltable. Such aircraft may also be equipped with a system (e.g. FCS 612 in FIG. 6) which may be configured to carry out a method for command prioritization in the aircraft as described above with reference to any or all of FIGS. 12-16.

Figure 18:
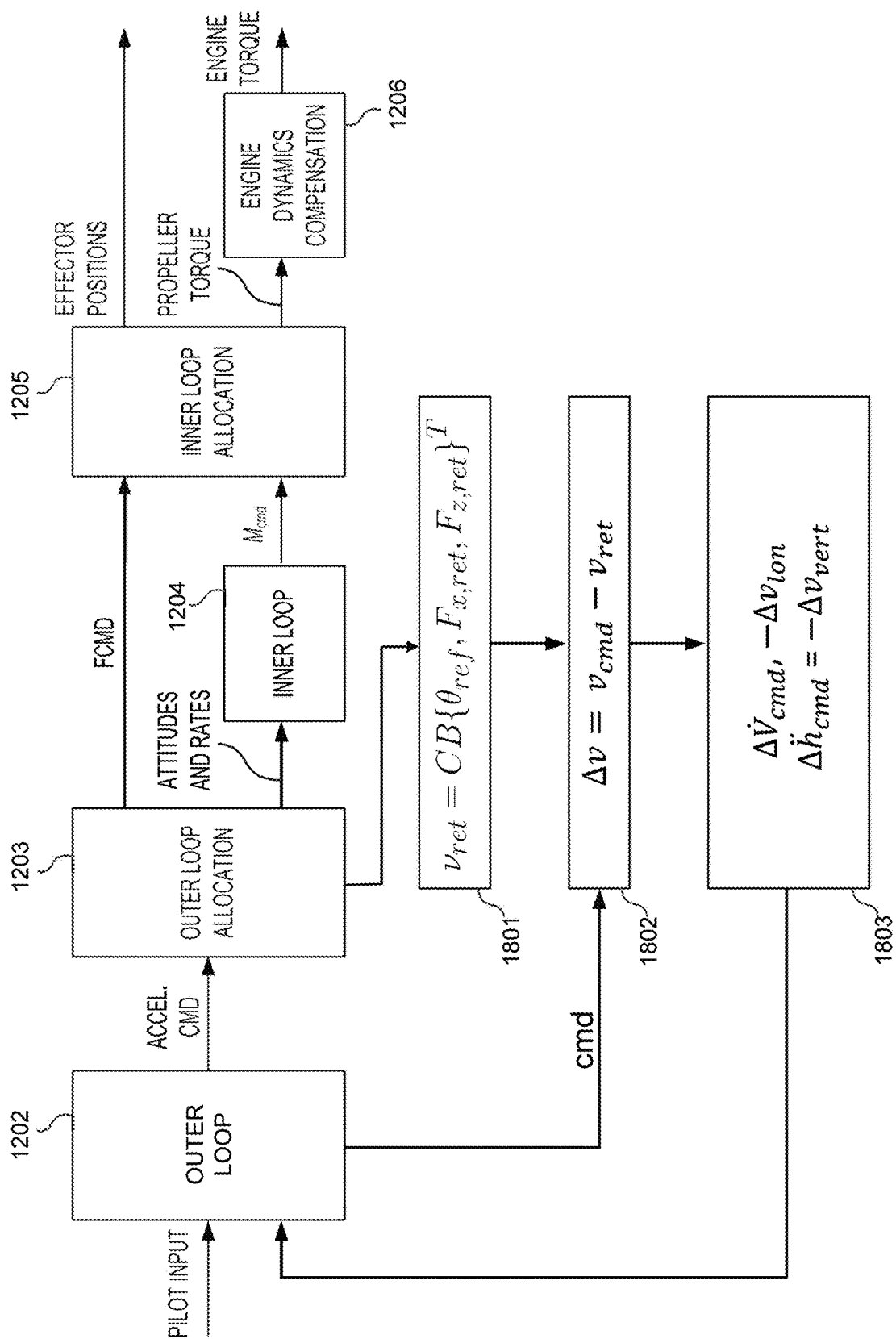
FIG. 18 illustrates a functional block diagram of an exemplary implementation of an alternative method for command prioritization in an aircraft with a corresponding feedback loop for continuous command verification.

FIG. 18 illustrates a functional block diagram of an exemplary implementation of a method for command prioritization in an aircraft, including a feedback loop for continuous command verification. Unless otherwise noted, similarly named elements in FIG. 18 may include the same features as described with respect to FIGS. 12 and/or 15. It is appreciated that the complexity and interconnectedness of the functionality described with respect to FIG. 18 would be impossible, or at least impractical, to effectively implement by a human user, especially when considering that these functionalities are implemented while the aircraft is flying (including taking off or landing). Additionally, it is appreciated that many benefits for aircraft flight can be achieved through the technical solutions described with respect to FIG. 18 (with or without functionality described with respect to other figures, such as FIGS. 11, 12, 13, 14, 15, 17, 18, 19 and/or 20), including improved aircraft safety and reduced pilot workload, as well as, for example, enhanced flight path efficiency and/or reduction of aircraft physical component stress.

As described with reference to FIG. 12, a pilot command may be translated into inputs indicative of pilot command that may be expressed in terms of physical response parameters by reference response shaping 1201. Outer loop 1202 may receive the input indicative of pilot command and transform it into a response vector, which may be represented by vertical and lateral acceleration commands. In some embodiments, prioritization function 1600, described above, may perform a saturation check to determine whether original input indicative of a pilot command may be realized within constraint data (e.g., based on at least one of airspeed, state of flight or flight envelope), consistent with disclosed embodiments. In some embodiments, if the execution of original command violates limits imposed by the constraint data, prioritization function may determine a priority of execution of commands between (e.g., relative to) airspeed and climb based on the constraint data and may assign weighting factors to each of the acceleration commands, for example as described with respect to FIG. 17A-C.

In addition, prioritization function 1600 may output a return acceleration command ($v_{ret}$) 1801, which may be derived from force and pitch components of the command realizable by the aircraft, for example, according to equation (2), where C denotes observation matrix for converting forces into accelerations, B represents aircraft dynamical models, $\theta_{ref}$ denotes attitude reference and $F_{x,ret}$, $F_{z,ret}$ stand for calculated returned longitudinal and vertical forces from inner loop allocation 1204 based on actual generated actuator commands.

Return acceleration command 1801 and an initial command indicative of pilot input may be compared to calculate a correction factor that may be referred to as command offset or command delta ($\Delta v$) 1802. Command delta 1802 may be applied to vertical acceleration command and longitudinal acceleration command according to weighting factors assigned to each command by prioritization function. For example, prioritization function 1600 may determine a priority of execution of climb over airspeed, such that 80% of command delta is subtracted from the initial longitudinal acceleration command ($-\Delta v_{lon}$) and 20% of command delta may be subtracted from the original vertical acceleration ($-\Delta v_{vert}$). Resultant updated command 1803 may be implemented for execution and in the absence of new commands, updated commands 1803 may be input back to outer loop 1202 to be translated into corresponding acceleration commands, which may be part of repeating cycle of command analysis and implementation.

Figure 19:
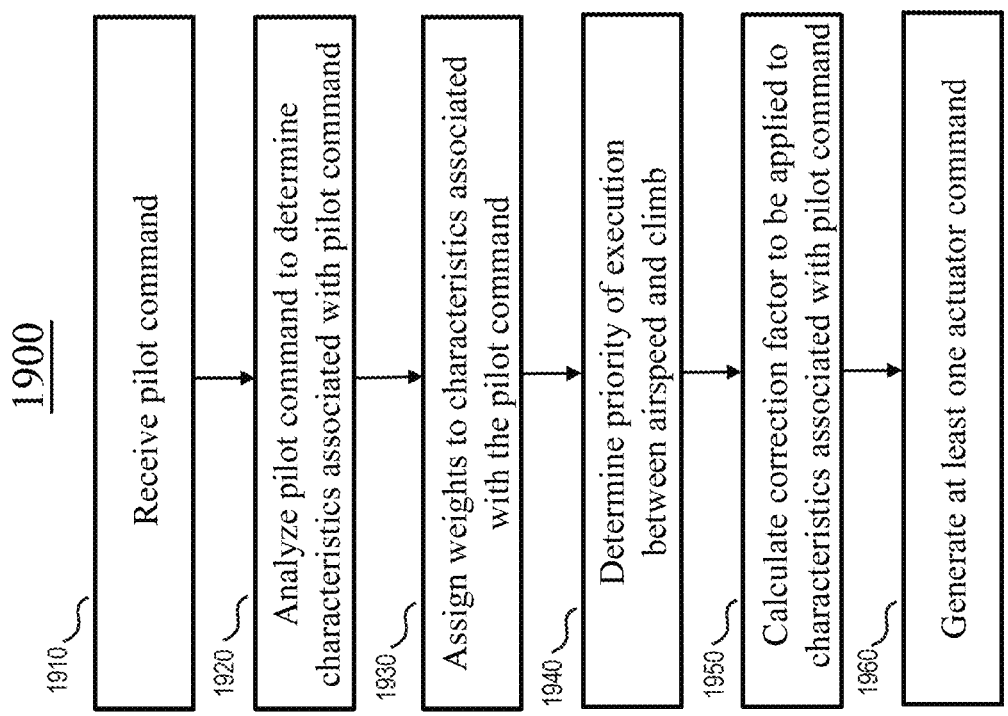
FIG. 19 illustrates a functional block diagram of an exemplary implementation of a method for airspeed and climb command prioritization, according to some embodiments.

FIG. 19 is a block diagram describing an exemplary computer-implemented method 1800 for command prioritization in an aircraft according to embodiments of the present disclosure. The boxes shown in FIG. 19 may represent any combination of software and/or modules, such as devices, programs, systems, subsystems, logic, models, and/or functions. For example, each box may represent a portion of software code that is executable by at least one processor (e.g., of system 1000), such as according to instructions stored on at least one computer-readable medium.

It is appreciated that the complexity and interconnectedness of the functionality described with respect to FIG. 19 would be impossible, or at least impractical, to effectively implement by a human user, especially when considering that these functionalities are implemented while the aircraft is flying (including taking off or landing) and that many of these functionalities (e.g., steps, operations) may be executed simultaneously. For example, at least one actuator command may be generated based on a first pilot command (e.g., at step 1860) while a second pilot command is being analyzed (e.g., at step 1820). Additionally, it is appreciated that many benefits for aircraft flight can be achieved through the technical solutions described with respect to FIG. 19 (with or without functionality described with respect to other figures, such as FIGS. 11, 12, 13, 14, 15, 16, 17, 18, 19 and/or 20), including improved aircraft safety and reduced pilot workload, as well as, for example, enhanced flight path efficiency and/or reduction of aircraft physical component stress.

The method may begin with step 1910, comprising receiving pilot command or an input indicative of the pilot command, which may include features described with respect to FIG. 12. For example, pilot commands may be received by reference response shaping 1201, which may be configured to translate a command issued by a pilot into one or more inputs indicative of pilot command that may be expressed in terms of physical response parameters, including but not limited to forces, moments, accelerations, velocities, and/or other parameters that may represent one or more outputs generated by the aircraft in response to at least one pilot command. In some embodiments, the pilot command may comprise information relating to accelerations, rates, moments and/or other parameters that may define motion of the aircraft.

In step 1920, the pilot command may be analyzed to determine characteristics associated with the pilot command, which may include features described with respect to FIG. 12. For example, a characteristic associated with the pilot command may include at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft. In one example, outer loop 1202 of FIG. 12 may receive the pilot command and analyze it to determine characteristics associated with the command. In some embodiments, analyzing pilot command may comprise extracting information relating to one or more of accelerations, rates, moments or other parameters that may define motion of the aircraft which may be encoded in the pilot command.

In step 1930, the computer-implemented method 1900 may comprise assigning weights to characteristics associated with the pilot command based on constraint data, which may include features described with respect to any of FIGS. 12, 16 and 17A-C, for example. The constraint data may be defined based on (e.g., may include) at least one of a flight safety envelope, a physical limit of operation of at least one actuator of the aircraft, a physical limit of operation of at least one effector of the aircraft, or a saturation check. For example, the constraint data may comprise a minimum airspeed to prevent stall of the aircraft (e.g., to ensure safe operation of the aircraft). The constraint data may define boundaries within which pilot command may be executed. For example, a pilot command will not be executed if the torque output of a rotor required by the pilot command exceeds the maximum torque a rotor may be capable of generating.

Weights may be assigned to characteristics associated with the pilot command based on the constraint data. For example, the weights may be assigned to increase (e.g., maximize) or decrease (e.g., minimize) an output of at least one cost function without violating the constraint data. As another nonexclusive example, as described with reference to FIG. 17A-17C the assignment of weighting factors may be performed based on current state of flight with respect to one or more constraints, for example airspeed or climb rate limits, flight envelope, pre-defined safe operating limits etc.

In step 1940, the computer-implemented method 1900 may comprise determining priority of execution between airspeed and climb. Determination of priority of execution may be performed by prioritization function 1600, which may be comprised in outer loop allocation 1203 of FIG. 12. Priority of execution may be determined based on assignment of weighting factors. For example, referring back to FIG. 17A, when airspeed approaches a lower limit, prioritization function may assign a larger weighting factor to airspeed than to climb. This in turn indicates execution of airspeed command is of higher priority than execution of climb command.

In step 1950, the computer-implemented method 1900 may comprise calculating correction factor (e.g., as discussed above) to be applied to characteristics associated with pilot command. In some embodiments, control system of an aircraft may not be capable of realizing a pilot command in its entirety, for example due to energy availability constraints, physical or safety constraints of aircraft components, and/or flight safety constraints. Based on determined priority of execution, the system (e.g. a component, module, function, or sub-system thereof) may calculate a correction factor to be applied to a command to enable its execution. For example, one prioritization function determines airspeed has a higher priority of execution than climb, the function may apply a larger correction factor to climb command. By applying a greater correction factor to the climb acceleration commands, the system may free up energy required for closer execution of airspeed command.

In step 1960, the computer-implemented method 1900 for command prioritization in an aircraft may generate at least one actuator command for aircraft control. In some embodiments, the computer-implemented method 1900 may transmit the at least one generated actuator command to at least one actuator (e.g., engine, flaperon, ruddervator, etc.) of the aircraft. Following prioritization of execution and command correction by applying the correction factor, flight control system may determine that the pilot command modified in this way may be safely executed.

Consistent with disclosed embodiments, a flight control system may include one or more outer loop allocation functions. For example, in an over-actuated aircraft (i.e., a number of control effectors is greater than a number of control axes), there may be multiple ways to generate forces and moments. While existing aircrafts typically have only a single method of creating forces about a given axis, in the over-actuated aircraft of the disclosed embodiments, there may be a multitude of methods in all axes, wherein each method may utilize a different combination of effector commands. Outer loop allocation functions may be configured to optimize allocation to generate optimized (e.g., optimal) forces and moments based on flight conditions (e.g., speed, tilt angle, flap position), actuator saturation, or failure of any actuators or effectors. By optimizing the allocation of control effectors, the outer loop allocation functions may provide benefits such as improving fuel and battery efficiency, increasing safety control margins, improving ride comfort, maximizing performance of the aircraft, and minimizing impacts in the case of actuator or effector failure. Such benefits may also be realized in aircraft that are not considered over-actuated.

In some embodiments, the aircraft of the disclosed embodiments may comprise a plurality of effectors, with at least one effector (e.g., each effector) comprising or connected to at least one actuator. Effectors may comprise controllers, engines, or any aircraft components configured to generate forces. Some examples of effectors may include flaperons 712 and ruddervators 714 in FIG. 7. Actuators may comprise electric propulsion systems and control surface actuators (CSAs), or any aircraft component configured to control the effectors. Additionally or alternatively, the aircraft may comprise a plurality of actuators associated with translational movements of the aircraft. Examples of actuators may include EPU inverters, tilt propeller actuators (TPACs) and battery management systems (BMSs) shown in FIG. 7.

Aircraft movements may be performed relative to control axes (e.g., x-axis, y-axis, z-axis, thrust). In some embodiments, the number of aircraft actuators may be greater than the number of control axes. For example, the aircraft may comprise 18 actuators (e.g., 6 actuators connected to lifter electric propulsion units of the electric propulsion system (i.e., each lifter electric propulsion unit connected to 1 engine actuator), 12 actuators connected to tilter electric propulsion units of the electric propulsion system (i.e., each tilter electric propulsion unit connected to an engine actuator and tilter actuator)) configured to control 4 axes of the aircraft, resulting in an over-actuated aircraft. With more actuators than control axes as well as several different actuator saturation and failure scenarios, there may be an infinite number of solutions (e.g., forces and attitudes) to achieve desired acceleration commands.

Therefore, utilizing only precalculated look-up tables may not be computationally resourceful as storing all solutions may require multiple look-up tables, which may occupy significant computer storage space. In addition, utilizing precalculated look-up tables may require going through every single solution in the look-up tables to find the an optimized (e.g., optimal) solution, and going through all of the multiple precalculated look-up tables may require utilizing significant computational resources and may also cause delays in responses. Furthermore, precalculated look-up tables comprise a finite set of solutions corresponding to a finite set of situations, which may result in a case where none of the solutions of the finite set of solutions corresponds to the active situation (e.g., actuator saturation and failure scenarios) of the aircraft. In other words, the flight control system may have to give up if there are no solutions in the finite set of solutions for the particular situation. With an outer loop allocation method, e.g. outer loop allocation 1203 of FIG. 12, the flight control system may be capable of handling more situations.

In some embodiments, the outer loop allocation function(s) may be configured to compute one or more forces and attitudes. For example, the outer loop allocation function(s) may be configured to compute one or more required forces (e.g., $F_x$, $F_z$) and aircraft attitudes (e.g., pitch, roll, heading) to achieve a commanded acceleration received from outer loop control 1202. In some embodiments, forces may comprise total forces from tilters and lifters in body x and body z axes. In some embodiments, the outer loop allocation function(s) may receive input from outer loop control 1202, and the input may comprise at least one of a longitudinal acceleration command or a vertical acceleration command. In some embodiments, the outer loop allocation function(s) may be configured to perform optimization of one or more outputs (e.g., command combinations). For example, optimization may comprise quadratic programming to solve allocation problems in real time. Additionally or alternatively, optimization may include decreasing (e.g., minimizing) at least one output of one or more cost functions, which may be prioritized with respect to one another. Performing allocation in real time may enable the outer loop allocation function(s) to handle dynamic situations, such as actuator saturation or failure, as soon as they are detected by the flight control system.

In some embodiments, one or more outer loop allocation functions may analyze inputs associated with pilot command to optimize execution of these commands, which may be help achieve safe and efficient aircraft operations. As described herein, the one or more outer loop allocation functions may simply be referred to as "outer loop allocation function", however it is to be understood that this expression may indicate participation or involvement of more than one function (and/or more than one associated program, more than one associated module, more than one associated device, more than one associated logical component, more than one associated device, more than one associated system, etc.).

Figure 20:
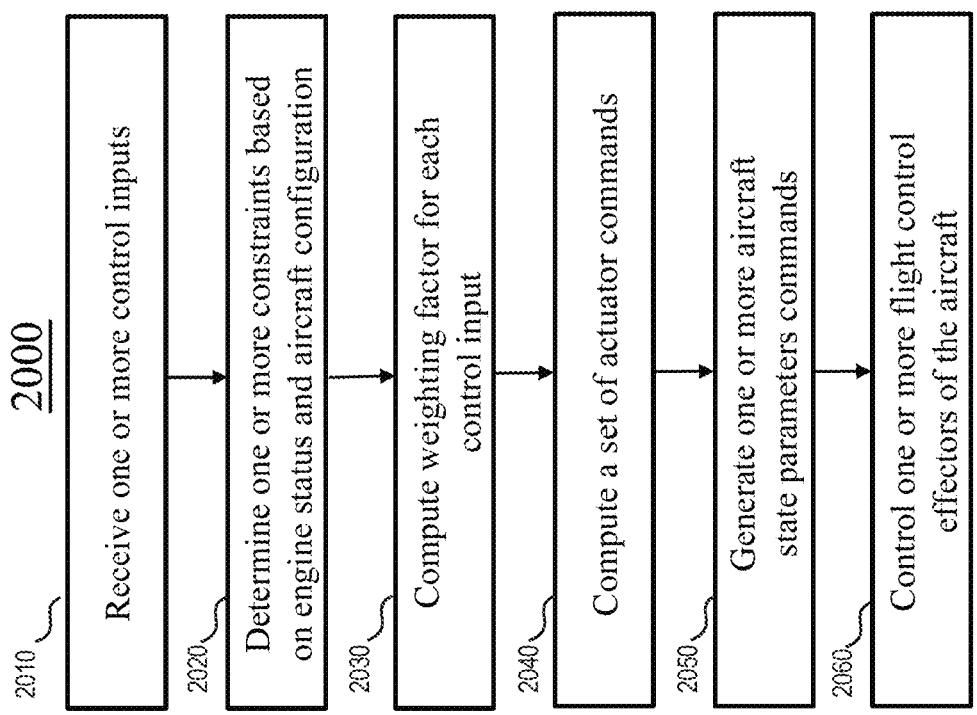
FIG. 20 is a block diagram describing an exemplary process of optimization carried out by outer loop allocation function(s) to generate a set of actuator commands.

In some embodiments, outer loop allocation function may be configured to perform (e.g., execute) an optimization method to generate an optimized set of one or more actuator command based on inputs representative of pilot command. Performing the optimization method may include imposing a set of limits or constraints, which may represent physical constraints of actuators and safety limits for aircraft performance, on algorithms (e.g., calculations) that are part of the optimization process. Additionally or alternatively, performing the optimization method may include using weights or weighting factors, which may represent priority and/or cost associated with command execution. For example, a first weight associated with a first command for a first aircraft component (e.g., effector) may be higher than a second weight associated with a second command for the first aircraft component or a second aircraft component, which may include a higher cost associated with the first command and/or a higher priority for the second command. FIG. 20 is a block diagram describing an exemplary process 2000 of optimization, which may be carried out by outer loop allocation function to generate a set of actuator commands, which may be expressed in terms of a displacement vector u.

In one example, an outer loop allocation function may receive a control command, $\upsilon_{cmd}$ (e.g. a command from control feedback 1018), which may be expressed, for instance, in terms of force, moment, or acceleration command. The control law command may be related to an actuator displacement vector u by Jacobian matrix 2102 J, according to equation (3).

$$\upsilon_{cmd} = J \cdot u \qquad (3)$$

As shown in step 2010, process 2000 may include receiving one or more control inputs. In some embodiments, the one or more control inputs may include at least one of a longitudinal control input and/or at least one vertical control input. For example, outer loop control 1202 may input acceleration commands (e.g., associated with longitudinal and vertical directions of motion) to outer loop allocation 1203. In some embodiments, the control input may be expressed by the command from the control law $\upsilon_{cmd}$.

A Jacobian matrix may be used in one or more processes or methods discussed herein. A Jacobian matrix may include a mathematical expression (e.g., used in multivariable calculus) that represents first-order partial derivatives of a vector-valued function. In some embodiments (e.g., in an aircraft control system), a Jacobian matrix may represent (e.g., describe, express, define, and/or interact with) the effects of control inputs such as actuator commands on changes in aircraft state parameters. In some embodiments, generating a set of actuator commands (for example as described with reference to FIG. 12) may include computing a Jacobian matrix indicative of (e.g., describing, representing, and/or configured to calculate) force and moment changes with respect to at least one (e.g., each) control input. In some embodiments, the Jacobian matrix may be computed based on at least one computerized aircraft model. In some embodiments, the at least one computerized aircraft model may model aircraft behavior based on physical characteristics of the aircraft, a state of flight (e.g., as described above), and/or flight conditions. For example, the Jacobian matrix may be based on an aircraft configuration (e.g., capabilities and placement of effectors, control surface geometry, actuator dynamics, shape of the aircraft, size of the aircraft, aircraft structural properties, propulsion system characteristics and/or weight of the aircraft) and flight conditions of the aircraft (e.g., air density, altitude, natural wind forces, atmospheric conditions, Mach number and/or configuration changes of the aircraft that may temporarily affect its aerodynamic properties). In some embodiment, outer loop allocation function may receive the at least one computerized aircraft model from outer loop 1202.

In some embodiments, process 2000 may include generating a set of actuator displacement vectors u, which may be based on (e.g., may be performed by using) a pseudo-inverse matrix of the Jacobian matrix. According to exemplary equation (3), solving for u may involve obtaining an inverse of Jacobian matrix. However, Jacobian matrix may not be a square matrix, preventing its inversion. Instead, a pseudo inverse Jacobian matrix $J^+$ may be generated, such as a Moore-Penrose pseudo-inverse matrix, and the displacement vector u, may be calculated according to eq. (4):

$$u = J^+ \cdot \upsilon_{cmd}. \qquad (4)$$

The relationship presented in equation (4) may have many solutions, as many displacement vectors u may satisfy the equality in equation (4), some of which may produce unphysical or impossible to execute actuator commands. Moreover, some commands that satisfy eq. (4) may violate one or more constraints and/or limits (e.g., may result in unsafe operation of the aircraft) and thus may, in some embodiments, be excluded by process 2000. In step 2020 (e.g., performed by an outer loop allocation function), process 2000 may determine one or more constraints based on at least one of an engine status of at least one (e.g., each) engine of the aircraft, an aircraft configuration, and/or a state of flight (e.g., to ensure safe and reliable execution of any received control inputs). In some embodiment, the one or more constraints may be dynamic (e.g., changing during flight) and may be based on at least one of an integrity threshold of at least on actuator of the aircraft, a failure scenario of at least one effector of the aircraft, or at least one limit from a flight envelope of the aircraft. The constraints or the limits may change over the time depending not only on static parameters such as physical limits of the actuators (or to account for their saturation and failure), but they may also be derived from dynamically changing limits such as flight envelope, which may help ensure that an optimization process does not return commands resulting in unsafe flight parameters.

In step 2030 (e.g., performed or executed by an outer loop allocation function), process 2000 may compute a weighting factor for at least one (e.g., each) control input of the received one or more control inputs. In some embodiments, the weighting factor for at least one (e.g., each) control input is based on a state of flight of the aircraft. Using the example of airspeed and climb prioritization, outer loop allocation function may receive acceleration commands associated with vertical and longitudinal directions of travel and may subsequently compute weighting factor. State of flight of the aircraft may refer to the current set of dynamic conditions and parameters that describe the aircraft's motion and orientation and thus may affect the weighting factor calculation.

In some embodiments, one or more weighting factors may be assigned to at least one control input ($W_u$) (e.g., one weighting factor may be assigned to one respective control input). A weighting factor may represent a cost associated with utilization of individual actuators. For example, a first control input associated with a larger weighting factor than other control inputs may suggest that using the first control input is more expensive (e.g., relative to at least one cost function) when compared to using the other control inputs. Additionally, in some embodiments weighting factors may be applied to longitudinal and vertical components of the command $\upsilon_{cmd}$ ($W_{cmd}$), which in some embodiments may represent prioritization between airspeed and climb as discussed with reference to FIG. 17A-C.

In step 2040 (e.g., performed or executed by an outer loop allocation function), process 2000 may compute a set of actuator commands based on the received one or more control inputs, one or more constraints, and/or a weighting factor for at least one control input. For example, process 2000 may compute a set of actuator commands based on the received one or more control inputs, one or more constraints, and a weighting factor for at least one (e.g., each) control input. Actuator commands may be calculated by solving a minimization problem. For example, process 2000 may calculate one or more actuator commands using equation (4) with a combination of one or more constraints (e.g., determined in step 2030) and one or more weighting factors (e.g., assigned in step 2040). In some embodiments, the input (e.g. constraints, weighting factors etc.) and the Jacobian matrix may be normalized (e.g., entries may be expressed on a unitless scale of values between and including 0 and 1), which may allow for a more efficient computation. Following such normalization, a set of actuator commands may be computed by solving a minimization problem to produce a set of optimized actuator commands for controlling the one or more flight control effectors, which is some embodiments may comprise solving a quadratic programming problem to decrease (e.g., minimize) a cost function output associated with the set of actuator commands.

In some embodiments, an outer loop allocation function may receive input indicative of at least one pilot command (e.g., from outer loop 1202), for example a set of vertical and longitudinal acceleration commands. Process 2000 may include a process of minimization by solving a quadratic programming (QP) problem (e.g., finding a minimum value of a quadratic objective function subject to linear constraints), and may generate (e.g., as a result of the minimizing) a set of commands satisfying eq. (4) that result in minimized (e.g., minimal) deviation from acceleration commands (e.g., received from outer loop 1202), while satisfying imposed constraints (e.g., from step 2030). The weighting factors assigned in step 2040 may indicate that at least command component has a higher priority of minimization relative to at least one other command component. For example, for operation in low-speed conditions (e.g., aircraft speeds below a predetermined threshold), using tilt control more than pitch control may improve a particular metric (e.g., passenger comfort during flight). As another example, in some states of flight, roll movement may be constrained by one or more weighting factors that restrict effector (e.g., flaperon) movement.

The minimization process may be performed from the perspective of reducing a cost (e.g., represented by at least one cost function), however the cost may denote different qualities associated with flight. In some embodiment, the cost may be associated with one of passenger comfort, energy efficiency, stability of the aircraft, vibration of at least one component of the aircraft, or maneuverability of the aircraft. In other embodiments, the cost may take into account different qualities, for example the cost may be associated with maintaining minimum energy consumption while providing maximum passenger comfort.

In some embodiments, the computation of the set of actuator commands may be performed using normalized values, such that regardless of scales or applicable physical units, most calculation parameters may be defined on a unitless scale from 0 to 1 (both 0 and 1 included in that scale). The output of the calculation may therefore be expressed in terms of normalized values and thus denormalization may be carried out to obtain a set of actuator commands express in correct values with corresponding units.

In step 2050 (e.g., performed or executed by an outer loop allocation function), process 2000 may generate one or more state parameter commands based on the computed set of actuator commands. The one or more state parameter commands may comprise at least one of one or more force commands, one or more attitude commands, or one or more state parameters (e.g., at least one instance acceleration rate and/or at least one attitude rates. For example, a set of generated actuator commands may comprise at least one tilter torque command, at least one lifter torque command, at least one tilt angle command, and/or at least one pitch angle command and these commands may be converted into pitch attitude, longitudinal force, and/or vertical force commands. For example, the outputs of the outer loop allocation 1203 may be received by inner loop 1204 and inner loop allocation 1205 as described with reference to FIG. 12 and FIG. 15.

In some embodiments, such as following step 2050, an output from outer loop allocation may be input to inner loop 1204 and inner loop allocation 1205, where the state parameter commands may be utilized to control one or more flight control effectors of the aircraft (step 1960). For example, the state parameter commands may be transmitted to one or more effectors of the aircraft from one or more computing devices (e.g., at least one FCC). The method described with reference to any of (including all of) FIGS. 11, 12, 13, 14 15, 16, 17, 18, 19 and/or 20 may be implemented by a system comprising at least one processor configured to carry out the method, and a plurality of actuator that may be couple to at least one effector. In some embodiments, the at least processor may be configured to perform the method described above to control operation of a plurality of actuators that are further configured to control operation of one or more (e.g., relevant) effectors. In some embodiments, any of (including all of) the methods, operations, and functionalities described with reference to FIGS. 11, 12, 13, 14, 15, 16, 17, 18, 19 and/or 20 may be implemented in an aircraft, for example aircraft 100 of FIG. 1. The aircraft may comprise fuselage 102, at least one wing (e.g. wing 104) mounted to fuselage 102, at least one stabilizer mounter to the rear of the fuselage (e.g. stabilizer 106) and a plurality of propellers mounted to the at least one wings (e.g. propellers 114), where at least one of the propellers may be tiltable. Such aircraft may also be equipped with a system (e.g. FCS 612 in FIG. 6) which may be configured to carry out the any of (including all of) methods, operations, and functionalities as described above with reference to FIGS. 11, 12, 13, 14, 15, 16, 17, 18, 19 and/or 20. In some embodiments, the method described with reference to any of (including all of) FIGS. 11, 12, 13, 14 15, 16, 17, 18, 19 and/or 20 may be stored in a non-transitory computer readable medium in form of instructions that may be executed by at least one processor of a system (e.g., FCS 612 in FIG. 6 or an FCC in FIG. 8) to carry out the method.

Additional aspects of the present disclosure may be further described via the following clauses:

1. A computer-implemented method for command prioritization in an aircraft, the method comprising:
   receiving a pilot command;
   analyzing the pilot command to determine characteristics associated with the pilot command, the characteristics relating to airspeed and climb of an aircraft;
   assigning weights to characteristics associated with the pilot command based on constraint data;
   determining priority of execution between airspeed and climb based on the weights assigned to the characteristics associated with the pilot command;
   calculating a correction factor to be applied to the characteristics associated with the pilot command based on determined priority; and
   generating at least one actuator command to control the aircraft based on determined priority of execution.

2. The computer-implemented method of clause 1, wherein determining the priority of execution between airspeed and climb comprises:
   performing at least one saturation check based on the pilot command; and
   calculating a command limit base on the at least one saturation check.

3. The computer-implemented method of clause 2, wherein determining the priority of execution between airspeed and climb is performed by a prioritization function configured to determine the priority of execution in response to a saturation detection based on the at least one saturation check.

4. The computer-implemented method of clause 3, wherein executing the prioritization function is performed by an outer loop allocation system.

5. The computer-implemented method of clause 4, wherein performing the at least one saturation check comprises determining if a thrust demand for at least one propeller of the aircraft is saturated.

6. The computer-implemented method of any of the preceding clauses, further comprising:
   converting the pilot command into at least one of a pitch command, a force command, or a moment command.

7. The computer-implemented method of any of the preceding clauses, wherein the characteristics associated with the pilot command further relate to at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft.

8. The computer-implemented method of any of the preceding clauses, wherein the constraint data is based on at least one of a current state of flight, an integrity threshold of at least one actuator, a failure scenario of at least one effector of the aircraft, or at least one limit from a flight envelope of the aircraft.

9. The computer-implemented method of clause 8, wherein the current state of flight comprises at least one of an airspeed of the aircraft, an altitude of the aircraft, a propeller tilt angle of at least one propeller of the aircraft, or a pitch angle of the aircraft.

10. The computer-implemented method of any of the preceding clauses, wherein the constraint data is defined based on at least one of a flight safety envelope, a physical limit of operation of at least one actuator of the aircraft, a physical limit of operation of at least one effector of the aircraft, or a saturation check.

11. The computer-implemented method of any of the preceding clauses, wherein the weights assigned to the characteristics associated with the pilot command are used by an optimization algorithm.

12. The computer-implemented method of any of the preceding clauses, wherein the weights assigned to the characteristics associated with the pilot command comprise two weights that are negatively correlated with each other.

13. The computer-implemented method of any of the preceding clauses, wherein the priority of execution between airspeed and climb is expressed by a linear function or by a non-linear function.

14. The computer-implemented method of any of the preceding clauses, wherein the constraint data includes a minimum airspeed to prevent stall of the aircraft.

15. A vertical take-off and landing aircraft (VTOL), comprising:
   a fuselage;
   at least one wing mounted to the fuselage;
   at least one stabilizer mounter to the rear of the fuselage;
   a plurality of propellers mounted to the at least one wings, wherein at least one of the propellers is tiltable; and
   a flight control system comprising a processing unit configured to carry out the method of any of the preceding clauses.

16. A system for command prioritization in an aircraft, the system comprising:
   a plurality of actuators, each actuator coupled to at least one effector; and
   at least one processor configured to:
      receive a pilot command;
      analyze the pilot command to determine characteristics associated with the pilot command, the characteristics relating to airspeed and climb of an aircraft;
      assign weights to characteristics associated with the pilot command based on constraint data;

determine priority of execution between airspeed and climb based on weights assigned to the characteristics associated with the pilot command;

calculate a correction factor to be applied to characteristics associated with the pilot command based on determined priority; and generate at least one actuator command to control the aircraft based on determined priority of execution.

17. The system of clause 16, wherein the at least one processor is further configured to: perform at least one saturation check on the pilot command; and calculate a command limit base on the at least one saturation check.

18. The system of clause 17, wherein the at least one processor is configured to execute a prioritization function to determine the priority of execution between airspeed and climb in response to a saturation detection based on the at least one saturation check.

19. The system of clause 17, wherein the at least one processor is configured to perform the at least one saturation check by determining if a thrust demand for at least one propeller of the aircraft is saturated.

20. The system of the clauses 16 to 19, wherein the at least one processor is configured to convert pilot command into at least one of a pitch command, a control input, a force command, or a moment command.

21. A computer-implemented optimization method for controlling flight of an aircraft, the optimization method comprising:

receiving one or more control inputs;

determining one or more constraints based on an engine status of each engine of the aircraft and an aircraft configuration;

computing a weighting factor for each control input of the received one or more control inputs;

computing a set of actuator commands based on the received one or more control inputs, one or more constraints, and the weighting factor for each control input;

generating one or more state parameter commands based on the computed set of actuator commands, the one or more state parameter commands comprising at least one force command or attitude command; and controlling one or more flight control effectors of the aircraft based on the generated one or more state parameter commands.

22. The computer-implemented optimization method of clause 21, wherein the weighting factor for each control input is based on a state of flight of the aircraft.

23. The computer-implemented optimization method of clause 21 or 22, wherein receiving at least one control input comprises receiving at least one of a longitudinal control input or a vertical control input.

24. The computer-implemented optimization method of any of the clauses 21 to 23, wherein the one or more constraints are dynamic and based on at least one of an integrity threshold of at least on actuator of the aircraft, a failure scenario of at least one effector of the aircraft, or at least one limit from a flight envelope of the aircraft.

25. The computer-implemented optimization method of any of the clauses 21 to 24, wherein the generating a set of actuator commands comprises:

computing a Jacobian matrix indicative of force and moment changes with respect to each control input;

generating a set of actuator displacement vectors using a pseudo-inverse matrix of the Jacobian matrix; and solving a minimization problem to produce a set of optimized actuator commands for controlling the one or more flight control effectors.

26. The computer-implemented optimization method of clause 25, wherein the solving the minimization problem to produce the set of optimized actuator commands further comprises solving a quadratic programming problem to minimize a cost function output associated with the set of actuator commands.

27. The computer-implemented optimization method of clauses 25 or 26, wherein the computing of the Jacobian matrix is based on at least one computerized aircraft model, wherein the at least one computerized aircraft model is based on an aircraft configuration and flight conditions of the aircraft.

28. The computer-implemented optimization method of any of the clauses 21 to 27, wherein the method is performed by at least one outer loop allocation function.

29. A vertical take-off and landing (VTOL) aircraft, comprising:

a fuselage;

at least one wing mounted to the fuselage;

at least one stabilizer mounter to the rear of the fuselage;

a plurality of propellers mounted to the at least one wings, wherein at least one of the propellers is tiltable; and a flight control system comprising a processing unit configured to carry out the method of any of the clauses 21 to 28.

30. A flight control system for outer loop allocation in an aircraft, the system comprising:

a plurality of actuators, each actuator coupled to at least one effector; and at least one processor configured to:

receive at least one control input;

determine one or more constraints based on an engine status of each engine of the aircraft and an aircraft configuration;

compute a weighting factor for each control input of the received one or more control inputs;

compute one or more forces and aircraft state parameters based on the received one or more control inputs, one or more constraints, and the weighting factor for each control input, the one or more aircraft state parameters comprising at least one force or aircraft attitude;

generate a set of actuator commands based on the computed one or more forces and aircraft state parameters; and control one or more flight control effectors of the aircraft based on the generated set of actuator commands.

31. The system of clause 30, further comprising memory, wherein the memory is configured to store an aircraft model database.

32. The system of clause 31, wherein the at least one processor is further configured to:

compute a Jacobian matrix indicative of force and moment changes with respect to each control input;

generate a set of actuator displacement vectors using pseudo-inverse matrix of the Jacobian matrix; and solve a minimization problem to produce a set of optimized actuator commands for controlling one or more flight control effectors.

33. The system of clause 32, wherein the at least one processor is configured to compute the Jacobian matrix based on at least one aircraft model from the aircraft model database, wherein the at least one aircraft model is based on aircraft configuration and flight conditions.

34. A computer readable medium storing instructions, which when executed by at least one processor, cause the at least one processor to perform the method of any of clauses 1-14 or 21-28.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended clauses cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being influenced by, or being responsive to. As used herein, "related to" or "relating to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following clauses. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

The invention claimed is:

1. A computer-implemented method for command prioritization in an aircraft, the method comprising:
    receiving, using at least one hardware processor, a pilot command;
    analyzing, using the at least one hardware processor, the pilot command to determine characteristics associated with the pilot command, the characteristics relating to airspeed and climb of an aircraft;
    assigning, using the at least one hardware processor, weights to characteristics associated with the pilot command based on constraint data;
    determining, using the at least one hardware processor, a priority of execution between airspeed and climb based on the weights assigned to the characteristics associated with the pilot command;
    calculating, using the at least one hardware processor, a correction factor based on the determined priority;
    updating, using the at least one hardware processor, the characteristics associated with the pilot command by applying the correction factor to the characteristics; and
    generating, using the at least one hardware processor, at least one actuator command to control the aircraft based on the updated characteristics associated with the pilot command.

2. The computer-implemented method of claim 1, wherein determining the priority of execution between airspeed and climb comprises:
    performing, using the at least one hardware processor, at least one saturation check based on the pilot command; and
    calculating, using the at least one hardware processor, a command limit base on the at least one saturation check.

3. The computer-implemented method of claim 2, wherein determining the priority of execution between airspeed and climb is performed by a prioritization function configured to determine the priority of execution in response to a saturation detection based on the at least one saturation check.

4. The computer-implemented method of claim 3, wherein executing the prioritization function is performed by an outer loop allocation system.

5. The computer-implemented method of claim 2, wherein performing the at least one saturation check comprises determining if a thrust demand for at least one propeller of the aircraft is saturated.

6. The computer-implemented method of claim 1, further comprising:
    converting, using the at least one hardware processor, the pilot command into at least one of a pitch command, a force command, or a moment command.

7. The computer-implemented method of claim 1, wherein the characteristics associated with the pilot command further relate to at least one of an acceleration of the aircraft, a pitch of the aircraft, a tilt angle of at least one propeller of the aircraft, an altitude of the aircraft, a rate of change of acceleration of the aircraft, a rate of change of a pitch of the aircraft, a rate of change of a tilt angle of at least one propeller of the aircraft, or rate of a change of altitude of the aircraft.

8. The computer-implemented method of claim 1, wherein the constraint data is based on at least one of a current state of flight, an integrity threshold of at least one actuator, a failure scenario of at least one effector of the aircraft, or at least one limit from a flight envelope of the aircraft.

9. The computer-implemented method of claim 8, wherein the current state of flight comprises at least one of an airspeed of the aircraft, an altitude of the aircraft, a propeller tilt angle of at least one propeller of the aircraft, or a pitch angle of the aircraft.

10. The computer-implemented method of claim 1, wherein the constraint data is defined based on at least one of a flight safety envelope, a physical limit of operation of at least one actuator of the aircraft, a physical limit of operation of at least one effector of the aircraft, or a saturation check.

11. The computer-implemented method of claim 1, wherein the weights assigned to the characteristics associated with the pilot command are used by an optimization algorithm.

12. The computer-implemented method of claim 1, wherein the weights assigned to the characteristics associated with the pilot command comprise two weights that are negatively correlated with each other.

13. The computer-implemented method of claim 1, wherein the priority of execution between airspeed and climb is expressed by a linear function or by a non-linear function.

14. The computer-implemented method of claim 1, wherein the constraint data includes a minimum airspeed to prevent stall of the aircraft.

15. A system for command prioritization in an aircraft, the system comprising:
a plurality of actuators, each actuator coupled to at least one effector; and
at least one processor configured to:
receive a pilot command;
analyze the pilot command to determine characteristics associated with the pilot command, the characteristics relating to airspeed and climb of an aircraft;
assign weights to characteristics associated with the pilot command based on constraint data;
determine a priority of execution between airspeed and climb based on the weights assigned to the characteristics associated with the pilot command;
calculate a correction factor based on the determined priority;
update the characteristics associated with the pilot command by applying the correction factor to the characteristics; and
generate at least one actuator command to control the aircraft based on the updated characteristics associated with the pilot command.

16. The system of claim 15, wherein the at least one processor is further configured to:
perform at least one saturation check on the pilot command; and
calculate a command limit base on the at least one saturation check.

17. The system of claim 16, wherein the at least one processor is configured to execute a prioritization function to determine the priority of execution between airspeed and climb in response to a saturation detection based on the at least one saturation check.

18. The system of claim 16, wherein the at least one processor is configured to perform the at least one saturation check by determining if a thrust demand for at least one propeller of the aircraft is saturated.

19. The system of claim 15, wherein the at least one processor is configured to convert pilot command into at least one of a pitch command, a control input, a force command, or a moment command.

20. A computer-implemented method for controlling flight of an aircraft, the method comprising:
receiving, using at least one hardware processor, one or more control inputs;
determining, using the at least one hardware processor, one or more constraints based on an engine status of each engine of the aircraft and an aircraft configuration;
computing, using the at least one hardware processor, a weighting factor for each control input of the received one or more control inputs;
computing, using the at least one hardware processor, a set of actuator commands based on the received one or more control inputs, one or more constraints, and the weighting factor for each control input;
generating, using the at least one hardware processor, one or more state parameter commands based on the computed set of actuator commands, the one or more state parameter commands comprising at least one force command or attitude command; and
controlling, using the at least one hardware processor, one or more flight control effectors of the aircraft based on the generated one or more state parameter commands.

21. The computer-implemented method of claim 20, wherein the weighting factor for each control input is based on a state of flight of the aircraft.

22. The computer-implemented method of claim 20, wherein receiving at least one control input comprises receiving, using the at least one hardware processor, at least one of a longitudinal control input or a vertical control input.

23. The computer-implemented method of claim 20, wherein the one or more constraints are dynamic and based on at least one of an integrity threshold of at least on actuator of the aircraft, a failure scenario of at least one effector of the aircraft, or at least one limit from a flight envelope of the aircraft.

24. The computer-implemented method of claim 20, wherein the generating a set of actuator commands comprises:
computing, using the at least one hardware processor, a Jacobian matrix indicative of force and moment changes with respect to each control input;
generating, using the at least one hardware processor, a set of actuator displacement vectors using a pseudo-inverse matrix of the Jacobian matrix; and
solving, using the at least one hardware processor, a minimization problem to produce a set of optimized actuator commands for controlling the one or more flight control effectors.

25. The computer-implemented method of claim 24, wherein the solving the minimization problem to produce the set of optimized actuator commands further comprises solving, using the at least one hardware processor, a quadratic programming problem to minimize a cost function output associated with the set of actuator commands.

26. The computer-implemented method of claim 24, wherein the computing of the Jacobian matrix is based on at least one computerized aircraft model, wherein the at least one computerized aircraft model is based on an aircraft configuration and flight conditions of the aircraft.

27. The computer-implemented method of claim 20, wherein the method is performed by at least one outer loop allocation function.

28. A flight control system for outer loop allocation in an aircraft, the system comprising:
a plurality of actuators, each actuator coupled to at least one effector; and
at least one processor configured to:
receive at least one control input;
determine one or more constraints based on an engine status of each engine of the aircraft and an aircraft configuration;
compute a weighting factor for each control input of the received one or more control inputs;
compute one or more forces and aircraft state parameters based on the received one or more control inputs, one or more constraints, and the weighting factor for each control input, the one or more aircraft state parameters comprising at least one force or aircraft attitude;

generate a set of actuator commands based on the computed one or more forces and aircraft state parameters; and control one or more flight control effectors of the aircraft based on the generated set of actuator commands.

29. The system of claim 28, further comprising memory configured to store an aircraft model database.

30. The system of claim 29, wherein the at least one processor is further configured to:

compute a Jacobian matrix indicative of force and moment changes with respect to each control input;

generate a set of actuator displacement vectors using pseudo-inverse matrix of the Jacobian matrix; and solve a minimization problem to produce a set of optimized actuator commands for controlling one or more flight control effectors.

* * * * *